United States Patent
Arai et al.

(10) Patent No.: US 6,891,004 B2
(45) Date of Patent: May 10, 2005

(54) TRANSITION METAL CATALYST COMPONENT FOR POLYMERIZATION, AND METHOD FOR PRODUCING A POLYMER BY MEANS THEREOF

(75) Inventors: Toru Arai, Machida (JP); Toshiaki Otsu, Machida (JP); Masataka Nakajima, Machida (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/246,641

(22) Filed: Sep. 19, 2002

(65) Prior Publication Data

US 2003/0149201 A1 Aug. 7, 2003

Related U.S. Application Data

(63) Continuation-in-part of application No. 09/926,523, filed as application No. PCT/JP01/02020 on Mar. 14, 2001, now abandoned.

(30) Foreign Application Priority Data

Mar. 14, 2000 (JP) .................................. 2000-069733
Jun. 21, 2000 (JP) .................................. 2000-185662

(51) Int. Cl.$^7$ .................................................. C08F 4/52
(52) U.S. Cl. .................. 526/134; 526/131; 526/160; 526/170; 526/943; 526/348; 526/346; 556/51; 556/52; 556/53; 502/103; 502/202
(58) Field of Search .................................. 526/347, 348, 526/160, 170, 943, 134; 502/123; 556/53, 52, 51

(56) References Cited

U.S. PATENT DOCUMENTS 5,883,213 A   3/1999   Arai et al. ................. 526/347
5,932,669 A * 8/1999   Rohrmann et al. ......... 526/160
6,066,709 A   5/2000   Arai et al. ................. 526/347
6,248,850 B1 * 6/2001   Arai ........................... 526/347
6,329,479 B1  12/2001  Arai et al. ................. 526/170
6,348,556 B1  2/2002   Arai et al. ................. 526/347
6,376,406 B1 * 4/2002   Ashe et al. ................. 502/103

FOREIGN PATENT DOCUMENTS

| WO | 97/15581 | 5/1997 |
|---|---|---|
| WO | 98/06759 | 2/1998 |
| WO | 00/20426 | 4/2000 |

OTHER PUBLICATIONS

Arthur J. Ashee, III: "Aminoboranediyl–Bridged Zirconocenes: Highly Active Olefin Polymerization Catalysts" ORGANOMETALLICS, vol. 18, no. 12, pp. 2288–2290.

Toru Arai, et al., International Symposium on "Future Technology for Polyolefin and Olefin Polymerization Catalysis", Mar. 21–24, 2001 at Tokyo Institute of Technology.

Toru Arai, et al., Polymer Preprints, Japan, vol. 50, No. 8 (2001), pp. 1414–1415.

* cited by examiner

Primary Examiner—David W. Wu
Assistant Examiner—Rip A Lee
(74) Attorney, Agent, or Firm—Oblon, Spivak, McClelland, Maier & Neustadt, P.C.

(57) ABSTRACT

A transition metal catalyst component for polymerization, composed of a metal complex comprising specific ligands and a specific substituted boron group and having a bridging group, which exhibits a very high activity for an olefin type (co)polymerization or an olefin-aromatic vinyl compound copolymerization, whereby the molecular weight of a copolymer obtainable, is high. A method for producing an olefin (co)polymer and an aromatic vinyl compound-olefin copolymer, by means thereof.

37 Claims, 6 Drawing Sheets

Relation between composition and melting point

■ Example copolymers  ▲ Comparative Example Et-St copolymers

Relation between composition and melting point

■ Example copolymers chloroform-soluble contents
▲ Comparative Example Et-St copolymers Relation between composition and melting point ■ Example  Chloroform-insoluble contents
▲ Comparative Example  Et-St copolymers
□ Comparative Example  Et-St copolymer composition chloroform-insoluble content
—— Multinominal (Comparative Example  Et-St copolymers)

Front view

Plan view

SP2 structure        SP3 structure

TRANSITION METAL CATALYST COMPONENT FOR POLYMERIZATION, AND METHOD FOR PRODUCING A POLYMER BY MEANS THEREOF

CROSS-REFERENCE TO RELATED APPLICATION

This application is a continuation in part of abandoned U.S. patent application Ser. No. 09/926,523 filed Nov. 14, 2001 and is incorporated entirely by reference herein.

TECHNICAL FIELD

The present invention relates to a metal catalyst component for polymerization, a polymerization catalyst and a method for producing a polymer by means thereof.

BACKGROUND ART

Metallocene Catalyst and Method for Producing an Olefin Type Polymer

An olefin polymerization catalyst comprising a metallocene compound having two ligands having cyclopentadienyl ring structures, and a cocatalyst (a methylalumoxane or a boron compound), has been widely used as a catalyst for producing a polyolefin. Particularly, a polymerization catalyst comprising a metallocene compound having a structure wherein two ligands are bridged by carbon or silicon, is known as a catalyst for producing LLDPE or an isotactic or syndiotactic polypropylene.

However, with respect to a metallocene compound (catalyst) wherein the bridging structure is boron, little has been reported, and only complexes having cyclopentadienyl groups and indenyl groups, are known (WO97/15581, Organometallics 1999, 18, 2288, J. Organomet. chem. 1997, 536–537, 361). In the case of these complexes, the activities for the production of LLDPE (linear low density polyethylene) or for the production of a polypropylene, are not so high.

Method for Producing an Aromatic Vinyl Compound-Olefin Copolymer

Some styrene-ethylene copolymers obtainable by using so-called single-site catalyst systems comprising a transition metal compound and an organoaluminum compound, and methods for their production, have been known.

JP-A-3-163088 and JP-A-7-53618 disclose styrene-ethylene copolymers where no normal styrene chain is present i.e. so-called pseudo random copolymers, obtained by using a complex having a so-called constrained geometrical structure. Here, a normal styrene chain is meant for a head-to-tail bond chain. Further, hereinafter styrene may sometimes be represented by St.

However, phenyl groups in the alternating structure of styrene-ethylene present in such pseudo random copolymers, have no stereoregularity. Further, no normal styrene chain is present, whereby the content of styrene can not exceed 50 mol %. Further, the catalytic activities are practically inadequate.

JP-A-6-49132 and Polymer Preprints, Japan, 42, 2292 (1993) disclose methods for producing similar styrene-ethylene copolymers wherein no normal St chain is present, i.e. so-called pseudo random copolymers, by using a catalyst comprising a bridged metallocene type Zr complex and a cocatalyst.

However, according to Polymer Preprints, Japan, 42, 2292 (1993), phenyl groups in the alternating structure of styrene-ethylene present in such pseudo random copolymers, have no substantial stereoregularity. Further, like in the case of a complex having a constrained geometrical structure, no normal styrene chain is present, and the styrene content can not exceed 50 mol %. The catalytic activities are also practically inadequate.

Further, it has recently been reported to produce a styrene-ethylene copolymer close to an alternating copolymer having a stereoregularity under a condition of an extremely low temperature (−25° C.) by using a specific bridged bisindenyl type Zr complex, i.e. rac[ethylenebis(indenyl)zirconium dichloride] (Macromol. Chem., Rapid Commun., 17, 745 (1996)).

However, from the 13C-NMR spectrum disclosed, it is evident that this copolymer has no normal styrene chain. Further, it copolymerization is carried out at a polymerization temperature of at least room temperature by using this complex, only a copolymer having a low styrene content and a low molecular weight is obtainable.

JP-A-9-309925 discloses a method for producing a styrene-ethylene copolymer employing a bridged zirconocene type catalyst having unsubstituted indenyl groups or substituted indenyl groups, wherein a boron bridging group having a substituent is disclosed. However, no specific disclosure is given relating to a specific boron-bridging complex. Further, JP-A-11-130808 discloses a method for producing a styrene-ethylene copolymer employing a bridged zirconocene type catalyst having benzindenyl type ligands, but there is no disclosure relating to a boron-bridging group.

The present invention is intended to provide a metal catalyst component for polymerization, and a method for producing an olefin (co)polymer and a method for producing an aromatic vinyl compound-olefin copolymer, by means thereof.

Hereinafter, an aromatic vinyl compound-olefin copolymer (styrene-ethylene copolymer) may be sometimes referred to as an olefin-aromatic vinyl compound copolymer (ethylene-styrene-copolymer).

DISCLOSURE OF THE INVENTION

The present inventors have found that a metal complex having specific ligands and a specific bridging group, exhibits a very high activity for (co)polymerization of an olefin or copolymerization of an aromatic vinyl compound-olefin compound, and the molecular weight of the copolymer thereby obtainable is also high, and the invention has been completed.

Namely, the present invention is a transition metal catalyst component to be used for polymerization, represented by the following formula (1).

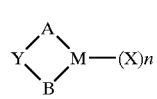

(1)

BEST MODE FOR CARRYING OUT THE INVENTION

Figure 1:
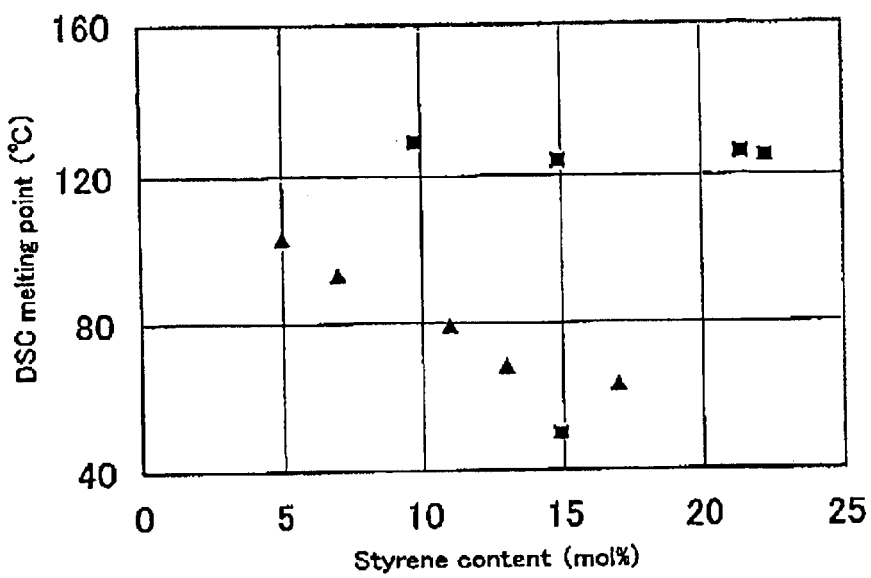
FIG. 1 shows a relation between DSC melting points and Comparative Example styrene-ethylene copolymers (RP-3 to RP-10 and respective Example copolymer compositions (styrene contents).

In the formula (1), A is an unsubstituted or substituted benzindenyl group which can be represented by the following formula (5), (6) or (7):

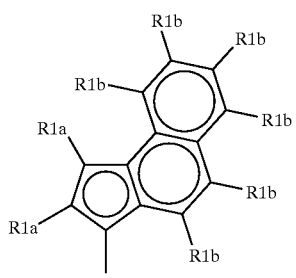
(5)

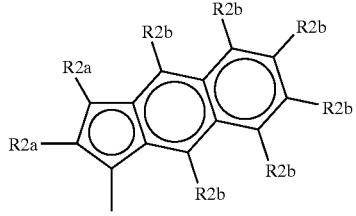
(6)

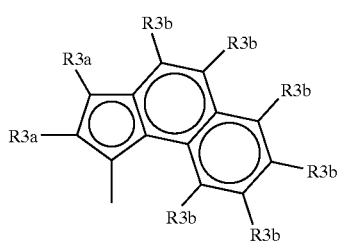
(7)

In the above formulae (5) to (7), each of R1a, R1b, R2a, R2b, R3a and R3b which are independent of each other, is hydrogen, a $C_{1-20}$ alkyl group, a $C_{5-10}$ aryl group or a $C_{7-20}$ alkylaryl group, they may contain from one to three halogen atoms, silicon atoms, phosphorus atoms, oxygen atoms, boron atoms, nitrogen atoms, sulfur atoms and/or selenium atoms, they may have a structure of an $OSiR_3$ group, a $SiR_3$ group, an $NR_2$ group, an OH group, an OR group or a $PR_2$ group (each R represents a $C_{1-10}$ hydrocarbon group), such a plurality of R1a, a plurality of R1b, a plurality of R2a, a plurality of R2b, a plurality of R3a or a plurality of R3b, may be the same or different from one another, and adjacent such substituents may together form a single or plural 5- to 8-membered aromatic or aliphatic rings.

Especially, for the production of an aromatic vinyl compound-olefin copolymer, the respective R1a, R2a and R3a are preferably hydrogen. As such examples, the following groups may be mentioned.

As an unsubstituted benzindenyl group, 4,5-benz-1-indenyl (another name: benz[e]indenyl), 5,6-benz-1-indenyl or 6,7-benz-1-indenyl may, for example, be mentioned, and as a substituted benzindenyl group, α-acenaphtho-1-indenyl, 3-cyclopenta[c]phenanthryl or 1-cyclopenta[1]phenanthryl may, for example, be mentioned. as a particularly preferred unsubstituted benzindenyl group, 4,5-benz-1-indenyl (another name: benz[e]indenyl) may, for example, be mentioned, and as such a substituted benzindenyl group, α-acenaphtho-1-indenyl, 3-cyclopenta[c]phenanthryl or 1-cyclopenta[1]phenanthryl may, for example, be mentioned.

Further, particularly for the production of an olefin polymer or an olefin copolymer, particularly preferably an ethylene-α-olefin copolymer, each one of R1a, R2a or R3a is preferably a $C_{1-20}$ alkyl group, a $C_{6-10}$ aryl group or a $C_{7-20}$ alkylaryl group. They may contain from one to three halogen atoms, silicon atoms, phosphorous atoms, oxygen atoms, boron atoms, nitrogen atoms, sulfur atoms or selenium atoms. They may have a structure of an $OSiR_3$ group, a $SiR_3$ group, an $NR_2$ group, an OH group, an OR group or a $PR_2$ group (each R represents a $C_{1-10}$ hydrocarbon group). Particularly preferably, the one of each R1a, R2a or R3a is a $C_{1-4}$ alkyl group.

As such examples, a 2-methyl-4,5-benz-1-indenyl group, a 2-methyl-5,6-benz-1-indenyl group, a 2-methyl-6,7-benz-1-indenyl group, a 1-(2-methylcyclopenta[1]phenanthryl) group and a 3-(2-methylcyclopenta[c]phenanthryl) group may, for example, be mentioned.

In the above formula (1), B is the same unsubstituted or substituted benzindenyl group as the above A, or an unsubstituted or substituted indenyl group, an unsubstituted or substituted fluorenyl group, or an unsubstituted or substituted cyclopentadienyl group, which can be represented by the following formula (8), (9) or (10). When both A and B are unsubstituted or substituted benzindenyl groups, both may be the same or different.

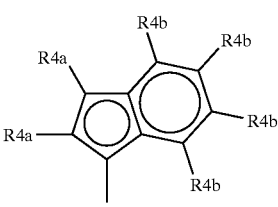
(8)

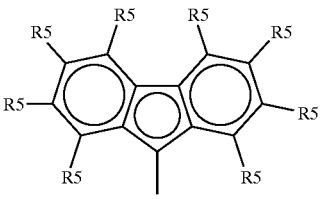
(9)

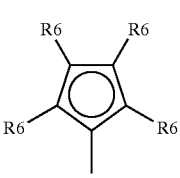
(10)

In the above formulae (8) to (10), each of R4a, R4b, R5 and R6 which are independent of each other, is hydrogen, a $C_{1-20}$ alkyl group, a $C_{6-10}$ aryl group or a $C_{7-20}$ alkylaryl group, they may contain from one to three halogen atoms, silicon atoms, phosphorus atoms, oxygen atoms, boron atoms, nitrogen atoms, sulfur atoms and/or selenium atoms, they may have a structure of an $OSiR_3$ group, a $SiR_3$ group, an $NR_2$ group, an OH group, an OR group or a $PR_2$ group (each R represents a $C_{1-10}$ hydrocarbon group), and such a plurality of R4a, a plurality of R4b, a plurality of R5 or a plurality of R6, may be the same or different from one another. Further, particularly for the production of an aromatic vinyl compound-olefin copolymer, R4a is preferably hydrogen. Further, particularly for the production of an olefin polymer or an olefin copolymer, particularly preferably an ethylene-α-olefin copolymer, one of R4a is preferably a $C_{1-20}$ alkyl group, a $C_{6-10}$ aryl group or a $C_{7-20}$ alkylaryl group. They may contain from one to three halogen atoms, silicon atoms, phosphorus atoms, oxygen atoms, boron atoms, nitrogen atoms, sulfur atoms or selenium atoms. They may have a structure of an $OSiR_3$ group, a $SiR_3$ group, an $NR_2$ group, an OH group, an OR group or a $PR_2$ group (each R represents a $C_{1-10}$ hydrocarbon group). Particularly preferably, one of R4a is a $C_{1-4}$ alkyl group.

However, B is preferably in a steric relation of a raceme (or a pseudoraceme) with A.

B is particularly preferably 4,5-benz-1-indenyl, as an unsubstituted benzindenyl group, or α-acenaphtho-1-indenyl, 3-cyclopenta[c]phenanthryl or 1-cyclopenta[1]phenanthryl, as a substituted benzindenyl group.

The unsubstituted indenyl group may, for example, be 1-indenyl, and the substituted indenyl group may, for example, be 4-alkyl-1-indenyl, 4-aryl-1-indenyl, 4,5-dialkyl-1-indenyl, 4,6-dialkyl-1-indenyl, 5,6-dialkyl-1-indenyl, 4,5-diaryl-1-indenyl, 5-aryl-1-indenyl, 4-aryl-5-alkyl-1-indenyl, 2,6-dialkyl-4-aryl-1-indenyl, 5,6-diaryl-1-indenyl, or 4,5,6-triaryl-1-indenyl.

Preferably, the unsubstituted indenyl group may be 1-indenyl, and the substituted indenyl group may be a 4-phenyl-1-indenyl group, a 4-naphthyl-1-indenyl group, a 2-methyl-1-indenyl group or a 2-methyl-4-phenyl-1-indenyl group.

The unsubstituted fluorenyl group may be a 9-fluorenyl group, and the substituted fluorenyl group may, for example, be a 7-methyl-9-fluorenyl group.

The unsubstituted cyclopentadienyl group may be cyclopentadienyl, and the substituted cyclopentadienyl group may, for example, be 4-aryl-1-cyclopentadienyl, 4,5-diaryl-1-cyclopentadienyl, 5-alkyl-4-aryl-1-cyclopentadienyl, 4-alkyl-5-aryl-1-cyclopentadienyl, 4,5-dialkyl-1-cyclopentadienyl, 5-trialkylsilyl-4-alkyl-1-cyclopentadienyl or 4,5-dialkylsilyl-1-cyclopentadienyl.

In the above formula (1), B is preferably the same unsubstituted or substituted benzindenyl group as the above A, and both A and B may be the same or different.

Y is a substituted boron group having bonds to A and B and having hydrogen or a $C_{1-20}$ hydrocarbon group, as a substituent. The substituent in Y may contain from one to three nitrogen, boron, silicon, phosphorous, selenium, oxygen or sulfur atoms, or may have a cyclic structure.

When Y is a substituted boron group having bonds to A and B and having hydrogen or a $C_{1-20}$ hydrocarbon group, as a substituent, the hydrocarbon substituent may, for example, be an alkyl group, an aryl group, an alkylaryl group or an arylalkyl group, and specific examples thereof include a phenylboranediyl group (another name: a phenylboryl group), a p-methylphenylboranediyl group, a methylboranediyl group, and an isopropylboranediyl group.

When Y is a substituted boron group having bonds to A and B and having a $C_{1-20}$ hydrocarbon group containing from one to three nitrogen, boron, silicon, phosphorus, selenium, oxygen or sulfur atoms, it may, for example, be a dialkylaminoboranediyl group (another name: a dialkylamideborane group), an alkyl-substituted silylboranediyl group, an alkyl-substituted silylaminoboranediyl group (another name: an alkyl-substituted silylamideborane group), an alkyl-substituted silyl-substituted methylboranediyl group, or an alkoxy-substituted boranediyl group. Specific examples thereof include a dimethylaminoboranediyl group, a diisopropylaminoboranediyl group, a dimethylsilylboranediyl group, a bistrimethylsilylaminoboranediyl group, a tristrimethylsilylmethylboranediyl group and a bistrimethylsilylmethylboranediyl group. Particularly preferred is a dimethylaminoboranediyl group, a diisopropylaminoboranediyl group, a dimethylsilylaminoboranediyl group, an isopropoxyboranediyl group or a tertiary butoxyboranediyl group. To the boron of Y, a suitable Lewis base such as trimethylphosphine, may be coordinated.

X is each independently hydrogen, halogen, a $C_{1-15}$ alkyl group, a $C_{3-15}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amide or amino group having a $C_{1-22}$ hydrocarbon substituent, n is an integer of 0, 1 or 2, and when X is plural, the plurality of X may have bonds. The halogen may, for example, be chlorine or bromine, the alkyl group may, for example, be a methyl group or an ethyl group, the aryl group may, for example, be a phenyl group, the alkylaryl group may, for example, be a benzyl group, the silyl group may, for example, be a trimethylsilyl group, the alkoxy group may, for example, be a methoxy group, an ethoxy group or an isopropoxy group, and the amide group may, for example, be a dimethyl amide group or an N-methylanilide group.

M is zirconium, hafnium or titanium, particularly preferably zirconium.

As examples of such a transition metal compound, the following compounds may be mentioned.

For example, diisopropylaminoboranediylbis(4,5-benz-1-indenyl)zirconium dichloride {another name: diisopropylaminoboranediylbis(benz[e]indenyl)zirconium dichloride, or diisopropylamideboranediylbis(4,5-benz-1-indenyl)zirconium dichloride}, dimethylaminoboranediylbis(4,5-benz-1-indenyl)zirconium dichloride, diethylaminoboranediylbis(4,5-benz-1-indenyl) zirconium dichloride, diisopropylaminoboranediyl (cyclopentadienyl)(4,5-benz-1-indenyl)zirconium dichloride, diisopropylaminoboranediyl(1-indenyl)(4,5-benz-1-indenyl)zirconium dichloride, diisopropylaminoboranediyl(1-fluorenyl)(4,5-benz-1-indenyl)zirconium dichloride, diisopropylaminoboranediyl (4-phenyl-1-indenyl)(4,5-benz-1-indenyl)zirconium dichloride, diisopropylaminoboranediyl(4-naphthyl-indenyl)(4,5-benz-1-indenyl)zirconium dichloride, diisopropylaminoboranediylbis(5,6-benz-1-indenyl) zirconium dichloride, diisopropylaminoboranediyl(5,6-benz-1-indenyl)(1-indenyl)zirconium dichloride, diisopropylaminoboranediylbis(6,7-benz-1-indenyl) zirconium dichloride, diisopropylaminoboranediyl(6,7-benz-1-indenyl)(1-indenyl)zirconium dichloride, diisopropylaminoboranediylbis(4,5-naphtho-1-indenyl) zirconium dichloride, diisopropylaminoboranediylbis (α-acenaphtho-1-indenyl)zirconium dichloride, diisopropylaminoboranediylbis(3-cyclopenta[c] phenanthryl)zirconium dichloride, diisopropylaminoboranediyl(3-cyclopenta[c]phenanthryl)

(1-indenyl)zirconium dichloride, diisopropylaminoboranediylbis(1-cyclopenta[1]phenanthryl)zirconium dichloride, diisopropylaminoboranediyl(1-cyclopenta[1]phenanthryl)(1-indenyl)zirconium dichloride, diisopropylaminoboranediylbis(4,5-benz-1-indenyl)zirconiumbis(dimethylamide), diisopropylaminoboranediyl(1-indenyl)(4,5-benz-1-indenyl)zirconiumbis(dimethylamide), diisopropylaminoboranediylbis(2-methyl-4,5-benz-1-indenyl)zirconium dichloride, diisopropylaminoboranediyl(2-methyl-4,5-benz-1-indenyl)(2-methyl-1-indenyl)zirconium dichloride, diisopropylaminoboranediyl(2-methyl-4,5-benz-1-indenyl)(1-indenyl)zirconium dichloride, diisopropylaminoboranediylbis{1-(2-methylcyclopenta[1]-phenanthryl)}zirconium dichloride, or diisopropylaminoboranediylbis(4,5-benz-1-indenyl)zirconiumbis(N-methylanilide) may be mentioned.

Further, phenylboranediylbis(4,5-benz-1-indenyl)zirconium dichloride {another name: phenylboranediylbis(benz[e]indenyl)zirconium dichloride or phenylborylbis(4,5-benz-1-indenyl) zirconium dichloride}, phenylboranediyl(cyclopentadienyl)(4,5-benz-1-indenyl)zirconium dichloride, phenylboranediyl(1-indenyl) (4,5-benz-1-indenyl)zirconium dichloride, phenylboranediyl(1-fluorenyl)(4,5-benz-1-indenyl)zirconium dichloride, phenylboranediyl(4-phenyl-1-indenyl)(4,5-benz-1-indenyl)zirconium dichloride, phenylboranediyl(4-naphthyl-1-indenyl)(4,5-benz-1-indenyl)zirconium dichloride, phenylboranediylbis(5,6-benz-1-indenyl)zirconium dichloride, phenylboranediyl(5,6-benz-1-indenyl)(1-indenyl)zirconium dichloride, phenylboranediylbis(6,7-benz-1-indenyl)zirconium dichloride, phenylboranediyl(6,7-benz-1-indenyl)(1-indenyl)zirconium dichloride, phenylboranediylbis(4,5-naphtho-1-indenyl)zirconium dichloride, phenylboranediylbis(α-acenaphtho-1-indenyl)zirconium dichloride, phenylboranediylbis (3-cyclopenta[c]phenanthryl)zirconium dichloride, phenylboranediyl(3-cyclopenta[c]phenanthryl)(1-indenyl)zirconium dichloride, phenylboranediylbis(1-cyclopenta[1]phenanthryl)zirconium dichloride, phenylboranediyl(1-cyclopenta[1]phenanthryl)(1-indenyl)zirconium dichloride, phenylboranediylbis(4,5-benz-1-indenyl)zirconium bis(dimethylamide), phenylboranediyl (1-indenyl)(4,5-benz-1-indenyl)zirconium bis(dimethylamide), phenylboranediylbis(2-methyl-4,5-benz-1-indenyl)zirconium dichloride, phenylboranediyl(2-methyl-4,5-benz-1-indenyl) (2-methyl-1-indenyl)zirconium dichloride, phenylboranediyl(2-methyl-4,5-benz-1-indenyl)(1-indenyl)zirconium dichloride, phenylboranediylbis{1-(2-methyl-cyclopenta[1]-phenanthryl)}zirconium dichloride, or phenylboranediylbis(4,5-benz-1-indenyl)zirconium bis(N-methylanilide) may, for example, be mentioned.

In the foregoing, transition metal compounds having a diisopropylaminoboranediyl group (a diisopropylamideborane group) or a phenylboranediyl group (a phenylboryl group) as Y, have been exemplified, but the present invention is not limited thereto.

Further, as transition metal compounds, zirconium complexes have been exemplified, but titanium or hafnium complexes similar to the compounds as described above can suitably be employed. Further, a mixture of a raceme and a meso form may be employed. Preferably, a raceme is employed. With respect to an asymmetric transition metal compound, a pseudoraceme is preferably employed. In such a case, a D-form or a L-form may be employed.

When the transition metal catalyst component of the present invention is used as a polymerization catalyst, it can exhibit a very high polymerization activity which has not heretofore been observed, for polymerization or copolymerization of an olefin such as ethylene or propylene. Further, the polymer or copolymer thereby obtainable can have a practically sufficiently high molecular weight.

Further, when the transition metal catalyst component of the present invention is used as a polymerization catalyst, it exhibits a very high activity for copolymerization of an aromatic vinyl compound-olefin. Particularly, it exhibits a high activity which has not heretofore been observed, for an aromatic vinyl compound-olefin copolymer having a relatively small content of an aromatic vinyl compound i.e. having an aromatic vinyl compound content of from 0.1 mol % to 30 mmol %. Further, the aromatic vinyl compound-olefin copolymer having such an aromatic vinyl compound content range, thereby obtainable, has a feature that it has a practically sufficiently high molecular weight.

Further, it is possible to produce a copolymer having a high aromatic vinyl compound content, particularly an aromatic vinyl compound-ethylene copolymer wherein the aromatic vinyl compound content exceeds 55 mol %.

In this specification, the aromatic vinyl compound content of the copolymer represents the content of units derived from an aromatic vinyl compound monomer, contained in the copolymer. The same applies to the olefin content or the diene content.

The second aspect of the present invention is a polymerization catalyst for the production of an olefin type polymer, or a polymerization catalyst for the production of an aromatic vinyl compound-olefin copolymer, having a very high activity and productivity, which comprises such a transition metal catalyst component for polymerization and a cocatalyst, and a method for producing an olefin type polymer or copolymer and a method for producing an aromatic vinyl compound-olefin copolymer, by means thereof.

As the cocatalyst to be used in the present invention, a cocatalyst which has heretofore been used in combination with a transition metal catalyst component, can be used. As such a cocatalyst, an aluminoxane (or an alumoxane) or a boron compound can suitably be used.

Further, the present invention provides a method for producing an aromatic vinyl compound-olefin copolymer wherein a copolymer to be used is an aluminoxane (or an alumoxane) represented by the following formula (2) or (3):

(2)

In the formula, R is a $C_{1-5}$ alkyl group, a $C_{6-10}$ aryl group or hydrogen, and M is an integer of from 2 to 100. The plurality of R may be the same or different from one another.

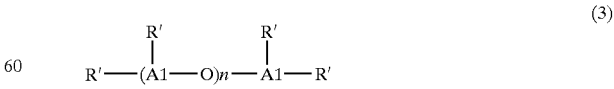

(3)

In the formula, R' is a $C_{1-5}$ alkyl group, a $C_{6-10}$ aryl group or hydrogen, and n is an integer of from 2 to 100. The plurality of R' may be the same or different from one another.

As the aluminoxane, methylalumoxane, ethylalumoxane or triisobutylalumoxane is preferably employed. Particularly preferably, methylalumoxane is employed. If necessary, a mixture of different types of such alumoxanes may be employed. Further, such an alumoxane may be used in combination with an alkylaluminum, such as trimethylaluminum, triethylaluminum, triisobutylaluminum or an alkylaluminum containing halogen, such as dimethylaluminum chloride.

Addition of an alkylaluminum is effective for removing substances which prevent polymerization, such as a polymerization inhibiter in the aromatic vinyl compound, or moisture in the aromatic vinyl compound or the solvent, or for removing adverse effects against the polymerization reaction.

However, it is not necessarily required to add an alkylaluminum at the time of the polymerization, if their amount is preliminarily reduced to a level not to influence the polymerization, by a known method such as preliminary distillation of the aromatic vinyl compound, the solvent, etc., bubbling with a dry inert gas or passing through a molecular sieve, or by increasing the amount of the alumoxane to some extent or adding the alumoxane in divided portions.

In the present invention, a boron compound may be used as a cocatalyst together with the above transition metal catalyst component.

The boron compound to be used as a cocatalyst may, for example, be triphenylcarbeniumtetrakis(pentafluorophenyl) borate {trityltetrakis(pentafluorophenyl)borate}, lithium tetra(pentafluorophenyl)borate, tri(pentafluorophenyl) boran, trimethylammoniumtetraphenyl borate, triethylammoniumtetraphenyl borate, tripropylammoniumtetraphenyl borate, tri(n-butyl)ammoniumtetraphenyl borate, tri(n-butyl)ammoniumtetra(p-tolyl)phenyl borate, tri(n-butyl) ammoniumtetra(p-ethylphenyl)borate, tri(n-butyl) ammoniumtetra(pentafluorophenyl)borate, trimethylammoniumtetra(p-tolyl) borate, trimethylammoniumtetrakis-3,5-tetramethylphenyl borate, triethylammoniumtetrakis-3,5-dimethylphenyl borate, tributylammoniumtetrakis-3,5-dimethylphenyl borate, tributylammoniumtetrakis-2,4-dimethylphenyl borate, aniliumtetrakispentafluorophenyl borate, N,N'-dimethylaniliumtetraphenyl borate, N,N'-dimethylaniliumtetrakis(p-tolyl)borate, N,N'-dimethylaniliumtetrakis(m-tolyl)borate, N,N'-dimethylaniliumtetrakis(2,4-dimethylphenyl)borate, N,N'-dimethylaniliumtetrakis(3,5-dimethylphenyl)borate, N,N'-dimethylaniliumtetrakis(pentafluorophenyl)borate, N,N'-diethylaniliumtetrakis(pentafluorophenyl)borate, N,N'-2,4, 5-pentamethylaniliumtetraphenyl borate, N,N'-2,4,5-pentaethylaniliumtetrraphenyl borate, di-(isopropyl) ammoniumtetrakispentafluorophenyl borate, di-cyclohexylammoniumtetraphenyl borate, triphenylphosphoniumtetraphenyl borate, tri(methylphenyl) phosphoniumtetraphenyl borate, tri(dimethylphenyl) phosphoniumtetraphenyl borate, triphenylcarbeniumtetrakis (p-tolyl)borate, triphenylcarbeniumtetrakis(m-tolyl)borate, triphenylcarbeniumtetrakis(2,4-dimethylphenyl)borate, triphenylcarbeniumtetrakis(3,5-dimethylphenyl)borate, tropiliumtetrakispentafluorophenyl borate, tropiliumtetrakis(p-tolyl)borate, tropiliumtetrakis(m-tolyl)borate, tropiliumtetrakis(2,4-dimethylphenyl)borate or tropiliumtetrakis(3,5-dimethylphenyl)borate.

Such a boron compound and the above-mentioned organoaluminum compound may be used at the same time.

Especially when a boron compound is used as a cocatalyst, addition of an alkylaluminum compound such as triisobutylaluminum is effective for the removal of impurities which adversely affect the polymerization, such as water contained in the polymerization system.

As olefins to be used in the present invention, $C_{2-20}$ α-olefins such as ethylene, propylene, 1-butene, 1-hexene, 4-methyl-1-pentene, 1-octene and $C_{5-20}$ cyclic olefins such as cyclopentene, norbornene and norbonadiene, are suitable. These olefins may be used in combination as a mixture of two or more of them. As such olefins, ethylene, propylene, 1-hexene or 1-octene are preferred.

Aromatic vinyl compounds to be used in the present invention may, for example, be styrene and various substituted styrenes such as p-methylstyrene, m-methylstyrene, o-methylstyrene, o-t-butylstyrene, m-t-butylstyrene, p-t-butylstyrene, p-chlorostyrene, o-chlorostyrene, and α-methylstyrene.

Industrially preferably, styrene, p-methylstyrene or p-chlorostyrene is used. Particularly preferably, styrene is used.

Further, at least one of $C_{4-30}$ dienes and polyenes having a plurality of carbon double bonds in their molecules, may be copolymerized, as the case requires. Such dienes and polyenes may, for example, be ethylidene norbornene, various isomers of vinylcyclohexane, butadiene, 1,4-hexadiene, 1,5-hexadiene or various divinylbenzenes of ortho, metha and para. As the divinylbenzene, a mixture of various isomers may be employed. The content of such a diene or polyene is usually from 0.001 mol % to 3 mol %, preferably from 0.01 mol % to 0.5 mol %, of the entirety.

For the production of a copolymer of the present invention, the above-mentioned olefin and/or the above exemplified aromatic vinyl compound, the transition metal catalyst component as a metal complex and the cocatalyst are contacted. As to the manner and order for contacting, an optional known method may be employed.

As a method for the above polymerization or copolymerization, it is possible to employ a method for carrying out the polymerization in a liquid monomer without using any solvent, or a method of using a single solvent or a mixed solvent selected from saturated aliphatic or aromatic hydrocarbons or halogenated hydrocarbons, such as pentane, hexane, heptane, cyclohexane, benzene, toluene, ethylbenzene, xylene, chlorobenzene, chlorotoluene, methylene chloride or chloroform. Preferably, a mixed alkane solvent, cyclohexane, toluene, or ethylbenzene is used. The polymerization mode may be either solution polymerization or slurry polymerization. Further, if necessary, a conventional method such as batch polymerization, continuous polymerization or multistep polymerization, may be employed.

A single or connected plural linear or loop pipe polymerization may also be used. In such a case, the pipe-shaped polymerizer may be equipped with a dynamic or static mixer, or various known mixers such as a static mixer serving also as a heat remover, or various known coolers such as a cooler provided with slender tubes for removing heat. Further, it may have a preliminary polymerizer of a batch type.

Further, a method of e.g. gas phase polymerization may be employed. The gas phase polymerization is economical and preferred particularly in a case where a homopolymer of an α-olefin having at most 6 carbon atoms such as ethylene or propylene, or a copolymer thereof, is to be produced. In the gas phase polymerization, the transition metal compound may be supported on an optional known support.

The copolymerization temperature is suitably from −78° C. to 200° C. A polymerization temperature lower than −78°

C. is industrially disadvantageous, and if the temperature exceeds 200° C., decomposition of the metal complex is likely to take place, such being undesirable. Industrially more preferably, the temperature is from 0 to 160° C., particularly from 30 to 160° C.

The pressure during the polymerization is suitably from 0.1 to 100 atm, preferably from 1 to 30 atm, industrially particularly preferably, from 1 to 10 atm.

When an organoaluminum compound is used as a cocatalyst, it is preferably used in an aluminum atom/complex metal atom ratio of from 0.1 to 100,000, preferably from 10 to 10,000, relative to the metal of the complex. If the ratio is smaller than 0.1, the metal complex can not effectively be activated, and if it exceeds 100,000, such will be economically disadvantageous.

When a boron compound is used as a cocatalyst, it is used in an atomic ratio of boron atom/complex metal atom of from 0.01 to 100, preferably from 0.1 to 10, particularly preferably 1. If the atomic ratio is less than 0.01, the metal complex can not effectively be activated, and if it exceeds 100, such is economically disadvantageous.

The metal complex and the cocatalyst may be prepared by mixing them outside the polymerization tank, or they may be mixed in the tank during polymerization.

Now, the olefin type polymer obtainable by the method of the present invention will be described. However, the olefin type polymer obtainable by the present invention is not limited to the following example.

The olefin type polymer obtainable by the method of the present invention is a homopolymer made of a $C_{2-20}$ α-olefin monomer or a $C_{5-20}$ cyclic olefin monomer, or a copolymer made of a plurality of monomers selected from such monomers. Preferably, it is an olefin polymer such as polyethylene, polypropylene or polybutene, an ethylene-α-olefin copolymer such as an ethylene-propylene copolymer, an ethylene-1-butene copolymer, an ethylene-1-hexene copolymer, or an ethylene-1-octene copolymer, or an ethylene-cyclic olefin copolymer such as an ethylene-norbornene copolymer.

Further, the above-mentioned diene or polyene may be copolymerized. As such an example, an ethylene-ethylidene norbornene copolymer, an ethylene-propylene-ethylidene norbornene copolymer, an ethylene-propylene-butadiene copolymer, an ethylene-propylene-divinylbenzene copolymer, or an ethylene-1-octene-divinylbenzene copolymer, may, for example, be mentioned.

The molecular weight of the olefin type polymer obtainable by the method of the present invention, is at least 1,000 and at most 1,000,000 by the weight average molecular weight, and it is from 30,000 to 500,000, when the mechanical properties and the processability of the polymer are taken into consideration. Further, the molecular weight distribution is usually from 1.2 to 6, preferably from 1.5 to 3.

The weight average molecular weight here is a molecular weight calculated as polystyrene obtained by GPC using a standard polystyrene. The same applies in the following description.

In the case of an olefin copolymer containing ethylene as the main component, its density usually shows a value of at most 0.96 and at least 0.82 g/cm$^3$. Further, the melting point by DSC can take a value of at least 70° C. and at most 140° C., preferably at least 90° C. and at most 135° C.

Further, the olefin type polymer can be produced by suitably changing the polymerization condition or the polymerization method, even if it is a polymer containing no long chain branched structure i.e. containing less than 0.1 branched carbon among 1,000 carbon atoms of the polymer, or a polymer having a long chain branched structure i.e. containing at least 0.1 branched carbon among 1,000 carbon atoms of the polymer.

Now, the aromatic vinyl compound-olefin copolymer obtainable by the method of the present invention will be described. The aromatic vinyl compound-olefin copolymer obtainable by the method of the present invention, is a copolymer comprising the above-mentioned olefin monomer and the above-mentioned aromatic vinyl compound. Particularly preferably, it is an ethylene-styrene copolymer. Further, the olefin to be used may be plural, and in such a case, the ethylene-α-olefin-aromatic vinyl compound copolymer may, for example, be an ethylene-propylene-styrene copolymer, an ethylene-1-hexene-styrene copolymer, an ethylene-1-butene-styrene copolymer or an ethylene-1-octene-styrene copolymer. The α-olefin in this ethylene-α-olefin-aromatic vinyl compound copolymer does not include ethylene. Further, the ethylene-cyclic olefin-aromatic vinyl compound copolymer may, for example, be an ethylene-norbornene-styrene copolymer.

Further, the above-mentioned diene or polyene may be copolymerized, and as such an example, an ethylene-styrene-ethylidene norbornene copolymer, an ethylene-styrene-ethylidene norbornene copolymer, an ethylene-styrene-butadiene copolymer, an ethylene-styrene-divinylbenzene copolymer, an ethylene-1-octene-styrene-divinylbenzene copolymer or an ethylene-1-butene-styrene-divinylbenzene copolymer may be mentioned. The aromatic vinyl compound-olefin copolymer containing such a diene or a polyene, can suitably be used for a cross copolymer disclosed in WO00/37517.

In the following, reference is made to a styrene-ethylene copolymer as an example of the aromatic vinyl compound-olefin copolymer of the present invention. However, the aromatic vinyl compound-olefin copolymer of the present invention is by no means restricted to such a styrene-ethylene copolymer.

The structure is determined by a nuclear magnetic resonance method (NMR).

The copolymer of the present invention may have main peaks at the following positions in 13C-NMR using TMS as standard.

Namely, it shows peaks attributable to the main chain methylene and the main chain methine carbon in the vicinity of from 24 to 25 ppm, 27 ppm, 30 ppm, from 34 to 37 ppm, from 40 to 41 ppm and from 42 to 46 ppm, peaks attributable to five atoms not bonded to the polymer chain among phenyl groups in the vicinity of 126 ppm and 128 ppm, and a peak attributable to one carbon bonded to the polymer main chain among phenyl groups in the vicinity of 146 ppm.

The styrene-ethylene copolymer of the present invention is a styrene-ethylene copolymer having a styrene content of at least 0.1 and less than 99.9%, more preferably at least 1 and less than 99.9%, by molar fraction, and the stereoregularity of phenyl groups in the alternating structure of styrene and ethylene of the following formula (4) contained in its structure is represented by an isotactic diad index m of larger than 0.75, and the alternating structure index λ of the following formula (i) is smaller than 70 and larger than 0.1, preferably smaller than 70 and larger than 1:

$$\lambda = A3/A2 \times 100 \tag{i}$$

Here, A3 is the sum of areas of three peaks a, b and c attributable to the carbons in styrene-ethylene alternating structure of the following formula (4'). Further, A2 is the sum of areas of peaks attributable to the main chain methylene and the main chain methine carbon, as observed within a range of from 0 to 50 ppm by 13C-NMR using TMS as standard:

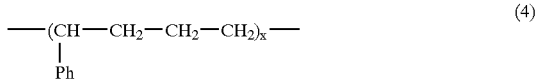

(4)

wherein Ph is an aromatic group such as a phenyl group, and x is an integer of at least 2, representing the number of repeating units,

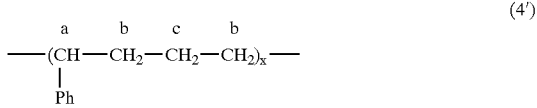

(4')

wherein Ph is an aromatic group such as a phenyl group, and x is an integer of at least 2, representing the number of repeating units.

In the styrene-ethylene copolymer of the present invention, the stereoregularity of phenyl groups in the alternating copolymer structure of ethylene and styrene being an isotactic structure is meant for a structure wherein the isotactic diad index m (or a meso diad fraction) is more than 0.75, preferably more than 0.85, more preferably more than 0.95.

The isotactic diad index m of the alternating copolymer structure of ethylene and styrene can be obtained by the following formula (ii) from an area Ar of the peak attributable to the r structure and an area Am of the peak attributable to the m structure appearing in the vicinity of 25 ppm.

$$m=Am/(Ar+Am) \qquad (ii)$$

The positions of the peaks may sometimes shift more or less depending upon the measuring conditions or the solvent used.

For example, when chloroform-d is used as a solvent, and TMS is used as standard, the peak attributable to the r structure appears in the vicinity of from 25.4 to 25.5 ppm, and the peak attributable to the m structure appears in the vicinity of from 25.2 to 25.3 ppm.

Further, when 1,1,2,2-tetrachloroethane-d2 is used as a solvent, and the center peak (shift value of 73.89 ppm from TMS standard) of the triplet of the 1,1,2,2-tetrachloroethane-d2 is used as standard, the peak attributable to the r structure appears in the vicinity of from 25.3 to 25.4 ppm, and the peak attributable to the m structure appears in the vicinity of from 25.1 to 25.2 ppm.

Here, the m structure represents a meso diad structure, and the r structure represents a racemic diad structure.

In the most preferred styrene-ethylene copolymer of the present invention, a peak attributable to the r structure of the alternating structure of ethylene and styrene is not substantially observed.

The styrene-ethylene copolymer of the present invention may preferably have a chain structure in which styrene units are bonded head-to-tail, i.e. a chain structure of at least two styrenes, preferably at least three styrenes, which can be represented by the following structure:

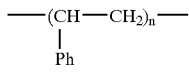

wherein n is an optional integer of at least 2, and Ph is an aromatic group such as a phenyl group.

The chain structure wherein two styrene units are bonded head-to-tail, gives peaks in the vicinity of from 42.4 to 43.0 ppm and from 43.7 to 44.5 ppm in the 13C-NMR measurement using TMS as standard and 1,1,2,2-tetrachloroethane-d2 as a solvent.

The chain structure in which at least three styrene units are bonded head-to-tail gives peaks also in the vicinity of from 40.7 to 41.0 ppm and from 43.0 to 43.6 ppm in a similar measurement. Accordingly, the chain structure in which at least two styrene units bonded head-to-tail gives a peak in the vicinity of from 40 to 45 ppm in a similar measurement.

On the other hand, in the conventional so-called pseudo random copolymer, no head-to-tail chain structure of styrene can be found even in the vicinity of 50 mol % at which the styrene content is maximum. Further, even if homopolymerization of styrene is attempted by using a catalyst for the preparation of a pseudo random copolymer, no polymer is obtainable. Depending upon e.g. the polymerization condition, an extremely small amount of an atarctic styrene homopolymer may sometimes be obtained. However, this is considered to have been formed by radical polymerization or cation polymerization by coexisting methylalumoxane or an alkylaluminum included therein.

Further, in the styrene-ethylene copolymer of the present invention, the stereoregularity of phenyl groups in the head-to-tail chain structure of styrene units is isotactic.

The stereoregularity of phenyl groups in the head-to-tail chain structure of styrene units being isotactic, is meant for a structure wherein the isotactic diad index ms (or a meso diad fraction) is larger than 0.5, preferably at least 0.7, more preferably at least 0.8.

The stereoregularity of the chain structure of styrene units is determined by the peak position of methylene carbon in the vicinity of from 43 to 44 ppm as observed by 13C-NMR and by the peak position of the main chain proton as observed by 1H-HMR.

It is known that peaks of methylene carbon of the structure derived from inversion of styrene in a conventional pseudo random copolymer having no stereoregularity, are present in two regions of from 34.0 to 34.5 ppm and from 34.5 to 35.2 ppm (for example, Polymer Preprints, Japan, 42, 2292 (1993)).

With the styrene-ethylene copolymer of the present invention, a peak attributable to methylene carbon of an inversion bond structure derived from styrene is observed in a region of from 34.5 to 35.2 ppm, but no substantial peak is observed at from 34.0 to 34.5 ppm.

This indicates one of the characteristics of the copolymer of the present invention and indicates that the copolymer of the present invention may have high stereoregularity of phenyl groups even with an inversion bond structure of the following formula derived from styrene.

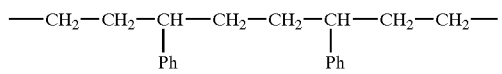

The weight average molecular weight of the styrene-ethylene copolymer obtainable by the present invention is at least 1,000 and at most 1,000,000, and taking into consideration the mechanical properties and the processability, it is preferably at least 30,000 and at most 500,000. The molecular weight distribution (Mw/Mn) is at most 6, preferably at most 4, particularly preferably at most 3 and at least 1.2.

In the foregoing, a styrene-ethylene copolymer has been described as a typical example of the aromatic vinyl compound-olefin copolymer of the present invention. However, the above description applies generally to an aromatic vinyl compound-olefin copolymer employing the above-mentioned aromatic vinyl compound.

Now, the present invention will be described with reference to Examples, but the present invention is by no means restricted to the following Examples.

The analyses of the copolymers obtained in the respective Examples and Comparative Examples were carried out by the following methods.

The 13C-NMR spectrum was measured using TMS as standard, by using α-500 manufactured by Nippon Denshi Kabushiki Kaisha and using a chloroform-d solvent or a 1,1,2,2-tetrachloroethane-d2 solvent. Here, the measurement using TMS as standard is the following measurement. Firstly, using TMS as standard, the shift value of the center peak of the triplet 13C-NMR peak of 1,1,2,2-tetrachloroethane-d2 was determined. The shift value of the triplet center peak of the 1,1,2,2-tetrachloroethane-d2 was 73.89 ppm. Then, the copolymer was dissolved in the 1,1,2,2-tetrachloroethane-d2, and the 13C-NMR was measured, and each peak shift value was calculated using the triplet center peak of the 1,1,2,2-tetrachloroethane-d2 as 73.89 ppm. The measurement was carried out by dissolving the polymer in an amount of 3 wt/vol % in the solvent.

The 13C-NMR spectrum measurement for quantitative analysis of peak areas, was carried out by a proton gate decoupling method having NOE erased, by using pulses with a pulse width of 45° and a repeating time of 5 seconds as standard.

When the measurement was carried out under the same conditions except that the repeating time was changed to 1.5 seconds, the measured values of peak areas of the copolymer agreed to the values obtained in the case where the repeating time was 5 seconds, within a measurement error range.

The styrene content in the copolymer was determined by 1H-NMR. As the apparatus, α-500 manufactured by Nippon Denshi Kabushiki Kaisha and AC-250 manufactured by BRUKER Co. were used. The determination was made by comparing the intensity of the peak (6.5 to 7.5 ppm) attributable to the proton of a phenyl group and the proton peak (0.8 to 3 ppm) attributable to an alkyl group, measured by using TMS as standard and chloroform-d or 1,1,2,2-tetrachloroethane-d2 as a solvent.

The molecular weights in Examples are weight average molecular weights obtained by GPC (gel permeation chromatography) as calculated as standard polystyrene.

A copolymer soluble in THF at room temperature, was measured by means of HLC-8020, manufactured by TOSOH CORPORATION using THF as a solvent.

A copolymer insoluble in THF at room temperature, was measured at 145° C. by means of HLC-8121 apparatus manufactured by TOSOH CORPORATION and using o-dichlorobenzene as a solvent.

The DSC measurement was carried out by using DSC200, manufactured by Seiko Denshi K.K. in a nitrogen stream at a temperature raising rate of 10° C./min. 10 mg of a sample was heated to 240° C. at a temperature raising rate of 20° C./min. (1st run), rapidly cooled to −100° C. to 240° C. at a rate of 10° C./min. and the DSC measurement was carried out (2nd run) to obtain the melting point, the heat of crystal fusion and the glass transition temperature.

MFR (melt flow rate) was measured in accordance with JIS K7210. The measurement was carried out at a temperature of 230° C. or 200° C. under a load of 5 kg.

Preparation of Complex 1 rac-Diisopropylaminoboranediylbis(4,5-benz-1-indenyl) zirconium dichloride (another name: rac-isopropylamideboranebis(4,5-benz-1-indenyl)zirconium dichloride) was prepared by the following method.

4,5-Benzindene was prepared by a known method.

rac-Diisopropylaminoboranediylbis(4,5-benz-1-indenyl) zirconium dichloride was prepared with reference to the synthesis of rac-diisopropylaminoboranediylbis(1-indenyl) zirconium dichloride as disclosed in Organometallics 1999, 18, 2288, but by changing the indene used, to 4,5-benzindene.

The obtained complex showed peaks at the following positions in 1H-NMR measured by using TMS as standard and using CDCl$_3$ as a solvent. δ1.50 ppm (d, 6H), 1.56 ppm (d, 6H), 4.23 (Hept, 2H), 5.89 (d, 21H) 6.99–8.04 (many peaks, 14H)

Preparation of Complex 2 rac-diisopropylaminoboranediylbis(4,5-benz-1-indenyl) zirconium dichloride (another name: rac-isopropylamideboranebis(4,5-benz-1-indenyl)zirconium dichloride)

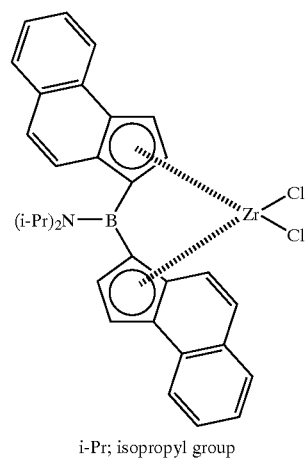

i-Pr; isopropyl group

Diisopropylaminoboranediylbis(2-methyl-4,5-benz-1-indenyl)zirconium dichloride (another name: diisopropylamideboranebis(2-methyl-4,5-benz-1-indenyl) zirconium dichloride) was prepared as follows.

2-Methyl-4,5-benzindene{1-H or 3-H-2-methylbenz[e] indene} was prepared by a known method.

It was prepared with reference to the synthesis of rac-diisopropylaminoboranediylbis(1-indenyl)zirconium dichloride as disclosed in Organometallics 1999, 18, 2288, but the indene used was changed to 2-methyl-4,5-benzindene.

The obtained complex was yellow crystals and showed peaks at the following positions in 1H-NMR measured by using TMS as standard and CDCl$_3$ as a solvent. δ1.56 ppm (d, 6H), 1.58 ppm (d, 6H), 2.28 (s, 6H), 4.33 ppm (Hept, 2H), 7.17–7.98 (many peaks, 14H)

Diisopropylaminoboranediylbis(2-methyl-4,5-benz-1-indenyl)zirconium dichloride {another name: rac-diisopropylamideboranebis(2-methyl-4,5-benz-1-indenyl) zirconium dichloride}

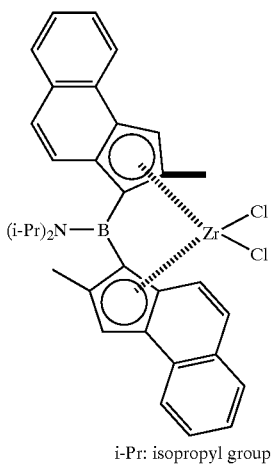

i-Pr: isopropyl group

EXAMPLE 1

Preparation of Ethylene-Styrene Copolymer

Polymerization was carried out by using an autoclave having a capacity of 10 l and equipped with a stirrer and a jacket for heating and cooling.

4,000 ml of dehydrated toluene and 800 ml of dehydrated styrene were charged, and the inner temperature was raised to 50° C., followed by stirring. About 100 l of nitrogen was used for bubbling to purge the interior of the system, and then, 8.4 mol of triisobutylaluminum and 8.4 mmol, based on Al, of methylalumoxane (PMAO-3A, manufactured by TOSOH-AKZO K.K.) were added thereto. Ethylene was immediately introduced, and after the pressure was stabilized at 1.1 MPa (10 kg/cm²G), 100 ml of a toluene solution having 8.4 μmol of rac-diisopropylamideboranebis(4,5-benz-1-indenyl)zirconium dichloride (catalyst A) and 0.84 mmol of triisobutyl aluminum dissolved, was added to the autoclave from a catalyst tank installed above the autoclave. Immediately thereafter, polymerization started, and heat generation was observed. Therefore, the jacket was switched to full cooling, but the internal temperature rose to a level of from 50° C. to the maximum of 89° C. Further, it was attempted to maintain the ethylene pressure at 1.1 MPa, but due to rapid absorption of ethylene, the supply did not catch up, and the pressure temporarily decreased to a level of 0.64 MPa. 21 Minutes later, the ethylene pressure was rapidly released, and the polymerization solution was discharged into a vessel containing a small amount of methanol to terminate polymerization, but from the consumption rate of ethylene (the consumption rate of ethylene during the polymerization is monitored by a mass flow controller), the polymerization was found to have proceeded without deactivation. The obtained polymerization solution was vigorously stirred and put into excess methanol in small portions to let the formed polymer precipitate. The product was dried under vacuum at 80° C. until no further weight change was observed, to obtain 447 g of a polymer.

EXAMPLES 2 and 3

Preparation of Ethylene-Styrene Copolymers

Polymerization and post treatment were carried out in the same manner as in Example 1 under the conditions shown in Table 1. The amount of the catalyst used was reduced, whereby it was possible to control the temperature and the pressure to be constant during the polymerization. Further, in either case, the polymerization was proceeding without deactivation at the time of termination of the polymerization.

EXAMPLES 4 to 6

Preparation of Ethylene-Octene Copolymers

Polymerization and post treatment were carried out in the same manner as in Example 1 under the conditions shown in Table 1 using 1-octene instead of styrene. The amount of the catalyst used was reduced, whereby it was possible to control the temperature and the pressure to be constant during the polymerization. Further, in each case, the polymerization was proceeding without deactivation at the time of termination of the polymerization.

EXAMPLE 7

Preparation of Ethylene-Octene-Styrene Copolymers

Polymerization and post treatment were carried out in the same manner as in Example 1 under the conditions shown in Table 1 by using ethylene and 1-octene.

In Table 1, the yield of the polymer and the content of the co-monomer are shown, and in Table 2, the analytical values of the obtained polymer are shown.

TABLE 1

| Examples, Comparative Examples | Catalyst | Amount of catalyst (μmol) | MAO (mmol) | Amount of solvent (ml) | Amount of styrene (ml) | Amount of octene (ml) | Ethylene pressure (MPa) | Polymerization temperature (° C.) | Polymerization time (min.) | Yield (g) | Activity (g/mol-catalyst · h)/10⁶ |
|---|---|---|---|---|---|---|---|---|---|---|---|
| Example 1 | A | 8.4 | P: 8.4 | T4000 | 800 | — | 1.1–0.64 | 50–89 | 21 | 447 | 152 |
| Example 2 | A | 2.1 | P: 8.4 | T4000 | 800 | — | 1.1 | 50–53 | 65 | 406 | 178 |
| Example 3 | A | 21 | P: 84 | T 800 | 4000 | — | 0.2 | 50 | 180 | 320 | 5.1 |
| Example 4 | A | 2.1 | P: 8.4 | T4400 | — | 400 | 1.1 | 50 | 20 | 453 | 647 |
| Example 5 | A | 0.8 | P: 8.4 | T4400 | — | 400 | 1.1 | 50 | 30 | 381 | 953 |
| Example 6 | A | 0.4 | P: 8.4 | T4700 | — | 100 | 1.1 | 50 | 60 | 326 | 815 |
| Example 7 | A | 2.1 | P: 8.4 | T4200 | 400 | 200 | 1.1 | 50 | 43 | 335 | 223 |
| Comparative Example 1 | B | 8.4 | P: 8.4 | T4000 | 800 | — | 1.1 | 70 | 180 | 137 | 5.4 |

TABLE 1-continued

| Examples, Comparative Examples | Cata- lyst | Amount of catalyst ($\mu$mol) | MAO (mmol) | Amount of solvent (ml) | Amount of styrene (ml) | Amount of octene (ml) | Ethylene pressure (MPa) | Polymeri- zation tempera- ture (° C.) | Polymeri- zation time (min.) | Yield (g) | Activity (g/mol- catalyst · h)/$10^6$ |
|---|---|---|---|---|---|---|---|---|---|---|---|
| Comparative Example 2 | B | 2.1 | P: 8.4 | T4400 | — | 400 | 1.1 | 50 | 60 | 308 | 147 |

T: Toluene
C: Cyclohexane
—: No monomer used
Transition metal compound used in the catalyst A: rac-diisopropylaminoboranediylbis (4,5-benz-1-indenyl) zirconium dichloride
B: rac-phenylboranediylbis (1-indenyl) zirconium dichloride

TABLE 2

| Examples, Comparative Examples | St content (mol %) | 1-Octene content (mol %) | Mw/$10^4$ | Mw/Mn | Glass transition temperature | Melting point (° C.) |
|---|---|---|---|---|---|---|
| Example 1 | 6.5 | — | 14.6 | 2.4 | −25 | 101.5 |
| Example 2 | 3.9 | — | 19.8 | 1.9 | −24 | 109.2 |
| Example 3 | 49.3 | — | 20.6 | 1.8 | 23 | 82.0 |
| Example 4 | — | 7.2 | 9.0 | 2.0 | −50 | 95.6 |
| Example 5 | — | 5.7 | 9.3 | 2.2 | −48 | 98.1 |
| Example 6 | — | 1.9 | 16.2 | 2.2 | −33 | 118.5 |
| Example 7 | 1.8 | 3.0 | 11.5 | 2.1 | −30 | 103.2 |
| Comparative Example 1 | 0 *1 | — | 81.8 | 2.3 | — | 137.0 |
| Comparative Example 2 | — | 0 *2 | Not measured | Not measured | — | 135.0 |

*1: No peak attributable to a phenyl group observed by 1H-NMR
*2: No peak attributable to a methyl group observed by 1H-NMR It is evident that the catalysts comprising rac-diisopropylaminoboranediylbis(4,5-benz-1-indenyl) zirconium dichloride and MAO(methylalumoxane) exhibit very high activities for copolymerization of ethylene-α-olefin and copolymerization of styrene-ethylene. Further, it is possible to obtain copolymers having practically sufficiently high molecular weights. Further, it is possible to present a copolymer having a high molecular weight particularly for a styrene-ethylene copolymer having a low styrene content.

Literatures Organometallics 1999, 18, 2288, and Organometallics 1999, 18, 1363 disclose results of copolymerization of ethylene-1-octene using a catalyst comprising rac-diisopropylaminoboranediylbis(1-indenyl)zirconium dichloride i.e. a zirconocene compound having indenyl groups and the same bridged structure as the transition metal compound of the present invention, and methylalumoxane. According to the disclosure, a polymerization test is carried out under polymerization conditions of a higher polymerization temperature (140° C.) and a higher ethylene pressure (3.4 MPa) than the Examples of the present invention, and a productivity of 17×$10^6$ g/(molZr·atm) is shown. In the literatures, the polymerization time is not disclosed. To those skilled in the art, it is a general common knowledge that under such high polymerization temperature and pressure conditions, the activity increases as compared with lower conditions.

The catalysts comprising a transition metal compound and MAO of the present invention exhibit high activities (per hour) of 953×$10^6$ g/(molZr·h) and 87×$10^6$ g/(molZr·h·atm) even under conditions of a lower polymerization temperature (50° C.) and pressure (1.1 MPa) in the Examples of the present invention. The polymerization was carried out for 30 minutes, but the polymerization was proceeding without deactivation, at the time of termination of the polymerization. Even from the yield of the polymer i.e. not from unit time, it is at least 44 g/(molZr·atm).

Namely, it is evident that it shows a remarkably higher polymerization activity than the above-mentioned catalyst comprising rac-diisopropylaminoboranediylbis(1-indenyl) zirconium dichloride and methylalumoxane.

13C-NMR of the copolymer obtained in Example 3 was measured. The meso diad fraction (isotactic diad index) obtained from the peak attributable to Sββ carbon of a styrene-ethylene alternate structure appearing in the vicinity of 25 ppm using TMS as standard, is at least 0.95, and it is evident that this copolymer has a high stereo regularity of isotactic in the alternating structure of ethylene and styrene. Further, in the vicinity of from 40 to 44 ppm, a peak attributable to a head-to-tail styrene chain structure was observed. Further, the alternating structural index λ obtained by the above-mentioned formula, was 50.

As the polymerization results of Example 7 and the analytical results of the obtained copolymer, show, the catalyst of this Example exhibits a high activity also in copolymerization of ethylene-styrene-1-octene and presents a copolymer having a high molecular weight.

COMPARATIVE EXAMPLES 1 and 2

With reference to WO97/15581, phenylboranediylbis(1-indenyl)zirconium dichloride was prepared. Using this as a transition metal compound, copolymerization of styrene-ethylene and copolymerization of ethylene-1-octene were carried out under the polymerization conditions shown in Table 1. In a case where this transition metal compound was used as a catalyst, the co-monomer was not copolymerized, and only polyethylene was obtained. Further, its activity was low as compared with Examples.

EXAMPLE 8

Preparation of an Ethylene-Octene Copolymer

Polymerization was carried out by using an autoclave having a capacity of 10 l and equipped with a stirrer and a jacket for heating and cooling.

4,400 ml of toluene and 400 ml of 1-octene were charged, and the internal temperature was raised to 50° C., followed by stirring. About 200 l of nitrogen was used for bubbling to purge the interior of the system, and 8.4 mmol of triisobutylaluminum and 8.4 mmol, based on Al, of methylalumoxane (PMAO-3A, manufactured by TOSOH-AKZO K.K.) were added thereto. Ethylene was immediately introduced, and after the pressure was stabilized at 1.1 MPa (10 kg/cm$^2$G), about 100 ml of a toluene solution having 0.84 µmol of rac-diisopropylaminoboranebis(2-methyl-4,5-benz-1-indenyl)zirconium dichloride (catalyst C) and 0.84 mmol of triisobutyl aluminum dissolved, was added to the autoclave from a catalyst tank installed above the autoclave. Immediately thereafter, polymerization started, and heat generation was observed. Therefore, the jacket was switched to full cooling, but the internal temperature rose to a level of from 50° C. to the maximum of 72° C. The ethylene pressure during the polymerization was maintained to be 1.1 MPa. 25 Minutes later, the ethylene pressure was rapidly released, and the polymerization solution was discharged into a vessel containing a small amount of methanol to terminate the polymerization, but from the consumption rate of ethylene (the consumption rate of ethylene during the polymerization is monitored by a mass flow controller), the polymerization was found to have proceeded without deactivation. The obtained polymerization solution was vigorously stirred and put into excess methanol in stall portions to let the formed polymer precipitate. The product was dried under vacuum at 80° C. until no further weight change was observed, to obtain 417 g of a polymer.

EXAMPLES 9 and 10

Polymerization and post treatment were carried out in the same manner as in Example 7 under the conditions shown in Table 3. The amount of the catalyst used was reduced, whereby it was possible to control the temperature and the pressure to be constant during the polymerization. Further, in either case, the polymerization was proceeding without deactivation at the time of termination of the polymerization.

In Table 3, the yield of the polymer and the content of the co-monomer are shown, and in Table 4, the analytical values of the obtained polymer are shown.

TABLE 3

| Examples, Comparative Examples | Catalyst | Amount of catalyst (µmol) | MAO (mmol) | Amount of solvent (ml) | Amount of octene (ml) | Ethylene pressure (MPa) | Polymerization temperature (° C.) | Polymerization time (min.) | Yield (g) | Activity (g/mol-catalyst · h)/10$^6$ |
|---|---|---|---|---|---|---|---|---|---|---|
| Example 8  | C | 0.84 | P: 8.4 | T4400 | 400 | 1.1 | 50–72  | 25 | 417 | 1191 |
| Example 9  | C | 0.21 | P: 4.2 | T4700 | 100 | 1.1 | 90–115 | 10 | 261 | 7460 |
| Example 10 | C | 0.21 | P: 4.2 | T4400 | 400 | 1.1 | 90–103 | 18 | 194 | 3080 |

Transition metal compound used in the catalyst
C: rac-diisopropylaminoboranediylbis (2-methyl-4,5-benz-1-indenyl) zirconium dichloride
Other symbols:
T: Toluene,
C: cyclohexane,
—: No monomer used
P: methylalumoxane (PMAO-3A, manufactured by TOSOH-AKZO K.K.)

TABLE 4

| Examples, Comparative Examples | 1-Octene content (mol %) | Mw/10$^4$ | Mw/Mn | Melting point (° C.) | MFR 230° C. under a load of 5 kg for 10 minutes |
|---|---|---|---|---|---|
| Example 8  | 5.8 | 16.9    | 2.2    | 94  | Not measured |
| Example 9  | 1.2 | 30.7 *1 | 2.5 *1 | 120 | 0.34 |
| Exanple 10 | 4.1 | 24.8 *1 | 2.6 *1 | 98  | 5.7 |

*1: Measured by high temperature GPC

It is evident that the catalysts comprising rac-diisopropylaminoboranediylbis(2-methyl-4,5-benz-1-indenyl)zirconium dichloride and MAO exhibit very high activities for copolymerization of ethylene-α-olefin. Further, it is possible to obtain copolymers having practically sufficiently high molecular weights.

The catalysts comprising the transition metal compounds and MAO of the present invention exhibit high activities (per hour) of $1.191 \times 10^6$ g/(molZr·h) and $108 \times 10^6$ g/(molZr·h·atm) even under the conditions of Example 8 of a lower polymerization temperature (70° C.) and a lower pressure (1.1 MPa) than the above-mentioned literatures. The polymerization was carried out for 25 minutes, but at the time of termination of the polymerization, polymerization was proceeding without deactivation. Even from the yield of the polymer by unit pressure rather than the unit time, it is at least 45 g/(molZr·atm).

Further, the catalysts comprising the transition metal compound of the present invention and MAO exhibit activities of $7,460 \times 10^6$ g/(molZr·h) and $3,080 \times 10^6$ g/(molZr·h), respectively, even under the conditions of Examples 9 and 10 of a lower polymerization temperature (90–115° C.) and a lower pressure (1.1 MPa) than the above-mentioned literatures. These activities correspond to high activities (per hour) of 678 g/(molZr·h·atm) and 280 g/(molZr·h·atm), respectively. The polymerization was carried out for 10 minutes and 18 minutes, respectively, but at the time of termination of the polymerization, polymerization was proceeding without deactivation. Even from the yield of the polymer by unit pressure rather than the unit time, it is at least $113 \times 10^6$ g/(molZr·atm) or at least $84 \times 10^6$ g/(molZr·atm), respectively.

Namely, it is evident that the polymerization catalysts comprising the transition metal compounds of the present Examples and the cocatalysts, exhibit remarkably higher polymerization activities than the catalyst comprising rac-diisopropylaminoboranediylbis(1-indenyl)zirconium dichloride and methylaluroxane, as disclosed in the above-mentioned literatures Organometallics 1999, 18, 2288, and Organometallics 1999, 18, 1363.

EXAMPLE 11

Into an autoclave having a capacity of 1 l and equipped with a stirrer, 300 ml of toluene was charged, and the internal temperature was raised to 70° C., followed by stirring. About 20 l of nitrogen was used for bubbling to purge the interior of the system, and 8.4 mmol of triisobutylaluminum and 8.4 mmol, based on Al, of methylalumoxane (PMAO-3A, manufactured by TOSOH-AKZO K.K.) were added thereto. Then, the autoclave was cooled to −50° C. by dryice-methanol, and 1.8 mol of propylene gas was introduced. From a pressure resistant tank installed above the autoclave, about 40 m of a toluene solution containing 8.4 μmol of catalyst rac-diisopropylaminoboranebis(2-methyl-4,5-benz-1-indenyl)zirconium dichloride (catalyst C) and 0.84 mmol of triisobutyl aluminum, was introduced together with propylene gas. The dryice-methanol gas was removed, and the temperature was raised to 50° C. over a period of about 15 minutes, followed by polymerization at 50° C. for 2.5 hours. After termination, the pressure was gradually released, and the polymerization solution was gradually put into methanol to let a polymer precipitate. The precipitated polymer was collected by filtration and heated at 80° C. for 8 hours in a vacuum drier to dry the polymer. 57.2 g of a powdery polymer was obtained.

The molecular weight of this polymer was measured by high temperature GPC, whereby the weight average molecular weight (Mw) was 81800, the number average molecular weight (Mn) was 33500, and Mw/Mn was 2.44.

Further, DSC was measured, whereby a melting point was observed at 145.7° C.

Preparation of Complex 3 rac-Phenylboranediylbis{1-(cyclopenta[1]phenanthryl)} zirconium dichloride, another name: rac-phenylbolylbis{1-(cyclopenta[1]phenanthryl)}zirconium dichloride, was prepared by the following method.

1H-cyclopenta[1]phenanthrene was prepared by a known method such as Organometallics, 16, 3413 (1997).

rac-Phenylboranediylbis{1-(cyclopenta[1]phenanthryl)} zirconium dichloride was prepared with reference to the synthesis of rac-phenylboranediylbis(1-indenyl)zirconium dichloride as disclosed in U.S. Pat. No. 5,962,718, by changing the indene to be used, to 1H-cyclopenta[1] phenanthrene, and it was obtained as bright yellow fine crystals.

The obtained complex showed peaks at the following positions in 1H-NMR measured by using TSM as standard.

1HNMR(400 MHz, CDCl$_3$) δ5.64 ppm (d, 2H), 7.37 ppm (d, 2H), 7.26–8.65 ppm (many peaks, 21H).

rac-Phenylboranediylbis{1-(cyclopenta[1]phenanthryl)} zirconium dichloride (another name: rac-phenylbolylbis{1-(cyclopenta[1]phenanthryl)}zirconium dichloride)

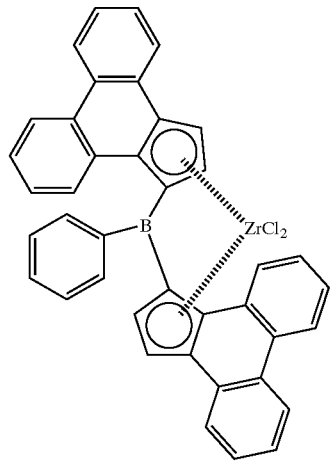

EXAMPLE 12

Preparation of an Ethylene-Styrene Copolymer

Polymerization was carried out by using an autoclave having a capacity of 10 l and equipped with a stirrer and a jacket for heating and cooling.

4,000 ml of dehydrated toluene and 800 ml of dehydrated styrene were charged, and the internal temperature was raised to 50° C., followed by stirring. About 100 l of nitrogen was used for bubbling to purge the interior of the system, and 8.4 mmol of triisobutylaluminum and 8.4 mmol, based on Al, of methylalumoxane (PMAO-3A, manufactured by TOSOH-AKZO K.K.) were added thereto. Ethylene was immediately introduced, and after the pressure was stabilized at 1.1 MPa (10 kg/cm$^2$G), 100 ml of a toluene solution having 2.1 μmol of rac-phenylboranediylbis{1-(cyclopenta[1]phenanthryl)}zirconium dichloride (catalyst D) and 0.84 mmol of triisobutyl aluminum dissolved, was added to the autoclave from a catalyst tank installed above the autoclave. During the polymerization, the internal temperature was maintained at 50° C. and the pressure was maintained at 1.1 MPa. One hour later, the ethylene pressure was rapidly released, and the polymerization solution was discharged into a vessel containing methanol to terminate the polymerization, but as is evident from the consumption rate of ethylene (the consumption rate of ethylene during the polymerization was monitored by a mass flow controller), the polymerization was found to have proceeded without deactivation. The obtained polymerization solution was vigorously stirred and put into excess methanol in small portions to let the formed polymer precipitate. The product was dried under vacuum at 80° C. until no further weight change was observed, to obtain 265 g of a polymer.

EXAMPLE 13

Preparation of an Ethylene-Octene Copolymer

Polymerization was carried out by using an autoclave having a capacity of 10 l and equipped with a stirrer and a jacket for heating and cooling.

4,700 ml of dehydrated toluene and 100 ml of 1-octene were charged, and the internal temperature was raised to 50° C., followed by stirring. About 100 l of nitrogen was used for bubbling to purge the interior of the system, and 8.4 mmol of triisobutylaluminum and 8.4 mmol, based on Al, of methylaluminoxane (PMAO-3A, manufactured by TOSOH-AKZO K.K.) were added thereto. The internal temperature was immediately raised to 90° C., and ethylene was introduced. After the pressure was stabilized at 1.1 MPa (10 kg/cm$^2$G), 100 ml of a toluene solution having 1.0 μmol of rac-phenylboranediylbis{1-(cyclopenta[1]phenanthryl)}zirconium dichloride (catalyst D) and 0.84 mmol of tri-isobutyl aluminum dissolved, was added to the autoclave from a catalyst tank installed above the autoclave. During the polymerization, the internal temperature rose temporarily to 105° C. by abrupt internal heat generation. Further, the ethylene pressure decreased temporarily to 0.9 MPa by the abrupt polymerization. The polymerization was terminated after the polymerization time of 5 minutes, but from the consumption rate of ethylene (the consumption rate of ethylene during the polymerization was monitored by a mass flow controller), the polymerization was found to have proceeded without deactivation. By similar post treatment, 173 g of a polymer was obtained.

In Table 5, the yield of the polymer and the content of the co-monomer are shown, and in Table 6, the analytical values of the obtained polymer are shown.

Further, when copolymerization of ethylene-styrene is carried out by using the transition metal compound of these Examples as a catalyst component, it is possible to produce a copolymer having a high styrene content under the same polymerization conditions.

Preparation of Complex 4 rac-Phenylboranediylbis{1-(2-methyl-cyclopenta[1]phenanthryl)}zirconium dichloride, another name: rac-phenylbolylbis{1-(2-methyl-cyclopenta[1]phenanthryl)}zirconium dichloride, was prepared by the following method.

1H-2-methyl-cyclopenta[1]phenanthrene was prepared by a known method such as Organometallics, 16, 3413 (1997).

rac-Phenylboranediylbis{1-(2-methyl-cyclopenta[1]phenanthryl)}zirconium dichloride was prepared in the following manner.

Preparation of a Ligand

A ligand was prepared with reference to the synthesis of rac-phenylboranediylbis(1-indenyl) zirconium dichloride as disclosed in U.S. Pat. No. 5,962,718, by changing the indene to be used, to 1H-(2-methyl-cyclopenta[1]phenanthrene).

That is, 50 ml of a diethyl ether solution of 5.0 g (21.7 mmol) of 1H-(2-methyl-cyclopenta[1]phenanthrene) was

TABLE 5

| Examples, Comparative Examples | Catalyst | Amount of catalyst (μmol) | MAO (mmol) | Amount of solvent (ml) | Amount of octene (ml) | Amount of styrene (ml) | Ethylene pressure (MPa) | Polymerization temperature (° C.) | Polymerization time (min.) | Yield (g) | Activity (g/mol-catalyst · h)/10$^6$ |
|---|---|---|---|---|---|---|---|---|---|---|---|
| Example 12 | D | 2.1 | P: 8.4 | T4000 | 800 | — | 1.1 | 50 | 60 | 265 | 126 |
| Example 13 | D | 1.0 | P: 8.4 | T4700 | — | 100 | 1.1–0.9 | 90–105 | 5 | 173 | 2076 |

T: Toluene,
C: cyclohexane,
—: No monomer used
Transition metal compound used in the catalyst
D: rac-phenylboranediylbis{1-(cyclopenta[1]phenanthryl)}zirconium dichloride

TABLE 6

| Examples Comparative Examples | St content (mol %) | 1-Octene content (mol %) | Mw/10$^4$ | Mw/Mn | Glass transition temperature (° C.) | Melting point (° C.) | MFR 200° C. under a load of 5 kg for 10 minutes |
|---|---|---|---|---|---|---|---|
| Example 12 | 14.9 | — | * | * | −21 | 50, 124 | 2.2 |
| Example 13 | — | 1.7 | 18.7 | 3.4 | −30 | 122 | Not measured |

*: Measured by high temperature GPC, but the molecular weight could not be measured as the refractive indices of the solvent and the polymer were close to each other and the sensitivity by the RI detector was low.

When the transition metal compound of these Examples, rac-phenylboranediylbis{1-(cyclopenta[1]phenanthryl)}zirconium dichloride, another name: rac-phenylbolylbis{1-(cyclopenta[1]phenanthryl)}zirconium dichloride, is used as a catalyst component, it is possible to produce an ethylene-styrene copolymer or an ethylene-octene copolymer, with a remarkably high activity. Further, this activity is remarkably high as compared with the results shown in Comparative Examples 1 and 2 (the results of using rac-phenylboranediylbis(1-indenyl)zirconium dichloride as a transition metal compound).

cooled to 0° C. in an argon stream, and an n-butyl lithium/hexane solution (21.7 mmol as butyl lithium) was then added thereto, and the mixture was stirred at room temperature for 3 hours. The diethyl ether solution of a lithium salt of 1H-(2-methyl-cyclopenta[1]phenanthrene) was dropwise added to 50 ml of a diethyl solution of PhBCl$_2$ (10.8 mmol) cooled to −75° C., and the mixture was stirred for 1 night while slowly returning the temperature to room temperature. After removing a supernatant liquid, the remaining solid was dried to obtain 6.45 g of phenylboranediylbis{1-(2-methyl-cyclopenta[1]phenanthrene)} ligand (crude yield 109%, including a salt and impurities).

Preparation of Zr Complex

A toluene solution (40 ml) of 3.08 g (5.65 mmol) of the above obtained ligand was added to a toluene solution (40 ml) of 1.54 g (5.77 mmol) of Zr (NMe$_2$)$_4$ under an argon atmosphere, and the mixture was refluxed with stirring for 4 hours. Thereafter, the solvent was distilled off under vacuum, and toluene (80 ml) and trimethylsilyl chloride (92.3 mmol) were added thereto, and the mixture was stirred for 1 night. After distilling off the solvent, the mixture was washed with pentane and extracted with methylene chloride, and a filtrate was concentrated and a crystal was precipitated. The crystal thus obtained was washed with diethyl ether to remove impurities, and diethyl ether attached to the crystal was removed by drying at 70° C. to 120° C. under vacuum. The crystal was extracted with methylene chloride again, and was subjected to filtration, and the filtrate was concentrated to precipitate a crystal. Thus, a clear yellow crystal of 0.2 g of rac-phenylboranediylbis{1-(2-methyl-cyclopenta[1]phenanthryl)} zirconium dichloride was obtained.

The obtained complex showed peaks at the following positions in 1H-NMR measured by using TSM as standard. 1HNMR(400 MHz, CDCl$_3$) δ1.71 ppm (methyl group s, 6H), 7.26 ppm (d, 2H), 7.12–8.79 ppm (many peaks, 21H).

Also, peaks of diethyl ether, a Lewis base and the like were not observed. That is, it was proved that a boron atom was not coordinated to this compound.

Further, since proton peaks of a methyl group of the ligand and a cyclopentadienyl ring of the ligand were equivalent (respectively observed as 6H of singlet and 2H of doublet), it was proved that three bonds of boron of the ligand were on the same plane and that two 2-methyl-cyclopenta[1]phenanthryl groups were on equivalent positions to the phenyl substituent of boron.

EXAMPLE 14

Preparation of an Ethylene-Octene Copolymer

Polymerization was carried out by using an autoclave having a capacity of 10 l and equipped with a stirrer and a jacket for heating and cooling. 4,700 ml of dehydrated toluene and 100 ml of 1-octene were charged, and the internal temperature was raised to 50° C., followed by stirring. About 100 l of nitrogen was used for bubbling to purge the interior of the system, and 4.2 mmol of triisobutylaluminum and 4.2 mmol, based on Al, of methylalumoxane (PMAO-3A, manufactured by TOSOH-AKZO K.K.) were added thereto. The internal temperature was immediately raised to 90° C., and ethylene was introduced. After the pressure was stabilized at 1.1 MPa (10 kg/cm$^2$G), about 100 ml of a toluene solution having 0.2 μmol of rac-phenylboranediylbis{1-(2-methyl-cyclopenta[1]phenanthryl)}zirconium dichloride (catalyst D) and 0.84 mmol of triisobutyl aluminum dissolved, was added to the autoclave. During the polymerization, the internal temperature rose temporarily to 105° C. by abrupt internal heat generation. Further, the ethylene pressure decreased temporarily to 1.08 MPa by the abrupt polymerization. The polymerization was terminated after the polymerization time of 16 minutes, but from the consumption rate of ethylene (the consumption rate of ethylene during the polymerization was monitored by a mass flow controller), the polymerization was found to have proceeded without deactivation. The polymer solution thus obtained was poured little by little into an excess amount of methanol with vigorous stirring to precipitate a polymer. The precipitated polymer was dried at 80° C. under vacuum until no weight change was observed, thus obtaining 162 g of a polymer.

EXAMPLES 15 and 16

Polymerization and post treatment were carried out under the conditions shown in Table 7 in the same manner as in Example 14, thus obtaining polymers in an amount of 218 g.

Polymer yields and comonomer contents are shown in Table 7, and analytical values of the obtained polymers are shown in Table 8.

TABLE 7

| Examples | Catalyst | Amount of catalyst (μmol) | MAO (mmol) | Amount of solvent (ml) | Amount of octene (ml) | Ethylene pressure (MPa) | Polymerization temperature (° C.) | Polymerization time (min.) | Yield (g) | Activity (g/mol-catalyst · h)/10$^6$ |
|---|---|---|---|---|---|---|---|---|---|---|
| Example 14 | E | 0.2 | P: 4.2 | T4700 | 100 | 1.1 | 90~101.5 | 16 | 162 | 3038 |
| Example 15 | E | 1.0 | P: 4.2 | T4400 | 400 | 1.1 | 90~105.4 | 7 | 218 | 1869 |
| Example 16 | E | 0.1 | P: 4.2 | T4800 | 0 | 1.1 | 92~106 | 10 | 153 | 9180 |

T: Toluene
Transition metal compound used in the catalyst
E: rac-phenylboranediylbis{1-(2-methyl-cyclopenta[1]phenanthryl)}zirconium dichloride

TABLE 8

| Examples | 1-Octene content (mol %) | Mw/10$^4$ | Mw/Mn | Melting point (° C.) | MFR 200° C. under a load of 2 kg for 10 minutes | MFR 230° C. under a load of 5 kg for 10 minutes |
|---|---|---|---|---|---|---|
| Example 14 | 1.7 | 25.0 | 3.0 | 118.2 | ~0 | 0.65 |
| Example 15 | 7.1 | 14.6 | 2.6 | 84.8 | 12 | — |
| Example 16 | 0 | 18.0 | 3.9 | 134 | 0.7 | — |

EXAMPLES 17 to 19

Polymerization and post treatment were carried out by using rac-phenylboranediylbis{1-(cyclopenta[1]phenanthryl)}zirconium dichloride under the conditions shown in Table 9 in the same manner as in Example 12.

Polymer yields are shown in Table 9, and analytical values of the obtained polymers are shown in Table 10.

TABLE 9

| Examples | Catalyst | Amount of catalyst (μmol) | MAO (mmol) | Amount of solvent (ml) | Amount of styrene (ml) | Ethylene pressure (MPa) | Polymerization temperature (° C.) | Polymerization time (min.) | Yield (g) |
|---|---|---|---|---|---|---|---|---|---|
| Example 12 | D | 2.1 | P: 8.4 | T4000 | 800 | 1.1 | 50 | 60 | 265 |
| Example 17 | D | 8.4 | P: 8.4 | T2400 | 2400 | 1.1 | 50 | 120 | 327 |
| Example 18 | D | 4.2 | P: 8.4 | T3200 | 1600 | 1.1 | 70 | 150 | 265 |
| Example 19 | D | 2.1 | P: 8.4 | T4000 | 800 | 1.1 | 70 | 80 | 168 |

T: Toluene,
—: No monomer used
Transition metal compound used in the catalyst
D: rac-phenylboranediylbis{1-(cyclopenta[1]phenanthryl)}zirconium dichloride

TABLE 10

| Examples | Polymer | St content (mol %) | Mw/$10^4$ | Mw/Mn | Glass transition temperature (° C.) | Melting point (° C.) In parentheses ( ): heat of melting crystal (J/g) | MFR 200° C. under a load of 5 kg for 10 minutes |
|---|---|---|---|---|---|---|---|
| Example 12 | P-12 | 14.9 | Note 1 | Note 1 | −21 | 50 (3), 124 (22) | 2.2 |
| Example 17 | P-17 | 22.3 | Note 2 | Note 2 | 9 | 125 (30) | 2.0 |
| Example 18 | P-18 | 21.4 | 16.4 | 3.2 | −7 | 126 (29) | 12 |
| Example 19 | P-19 | 9.8 | 26.0 | 1.9 | −22 | 129 (53) | 7.6 |

Note 1: Measured by high temperature GPC, but the molecular weight could not be measured as the refractive indices of the solvent and the polymer were close to each other and the sensitivity by the RI detector was low.
Note 2: Measured by high temperature GPC, but the molecular weight could not be measured as the positive peak and the negative peak were observed.

COMPARATIVE EXAMPLES 3 to 10

Styrene-ethylene copolymers having respective styrene contents were obtained by polymerizing by using rac-dimethylmethylenebis(4,5-benzo-1-indenyl)zirconium dichloride or rac-dimethylmethylenebis(3-cyclopenta[c]phenanthryl)zirconium dichloride as a catalyst and methylalumoxane (MAO) as a cocatalyst under an ethylene pressure of 1.1 MPa in accordance with a method (polymerization temperature 50° C. to 70° C.) disclosed in EP-0872492A2 and JP-A-11-130808, and analytical results of the styrene-ethylene copolymers thus obtained are shown in the following Table 11.

TABLE 11

| Comparative Examples | | St content (mol %) | Mw/$10^4$ | Mw/Mn | Melting point (° C.) | Glass transition temperature (° C.) |
|---|---|---|---|---|---|---|
| Comparative Example 3 | RP-3 | 2 | 12.0 | 2.3 | 118 | −26 |
| Comparative Example 4 | RP-4 | 5 | 18.5 | 2.1 | 103 | −25 |
| Canparative Example 5 | RP-5 | 7 | 18.0 | 2.0 | 93 | −28 |
| Canparative Example 6 | RP-6 | 11 | 16.0 | 1.9 | 79 | −22 |
| Comparative Example 7 | RP-7 | 13 | 22.7 | 2.0 | 68 | −23 |
| Comparative Example 8 | RP-8 | 17 | 17.5 | 2.0 | 63 | −22 |
| Comparative Example 9 | RP-9 | 21 | 18.5 | 2.0 | 50 | −18 |
| Comparative Example 10 | RP-10 | 29 | 13.2 | 2.0 | Not measured | −7 |

FIG. 1 shows a relation between DSC melting points and Comparative Examples styrene-ethylene copolymers (RP-3 to RP-10) and respective Example copolymer compositions (styrene contents).

It is evident that copolymers obtained by Examples 12 and 17 to 19 have at least one DSC melting point at 110° C. or higher regardless of their compositions (styrene contents). Also, it is evident from X-ray diffraction method that a diffraction peak attributable to an ethylene chain transfer structure was obtained. Further, it was observed that melting points of the styrene-ethylene copolymers of Comparative Examples were remarkably lowered as styrene contents increase.

EXAMPLES 20 to 23

Solvent Fractionation

About 3 g of each copolymer obtained in the Examples was accurately weighed, and was subjected to Soxhlet extraction for 8 hours by using chloroform as a solvent. Analytical results of chloroform-soluble contents and chloroform-insoluble contents are shown in the following Table 12.

Figure 2:
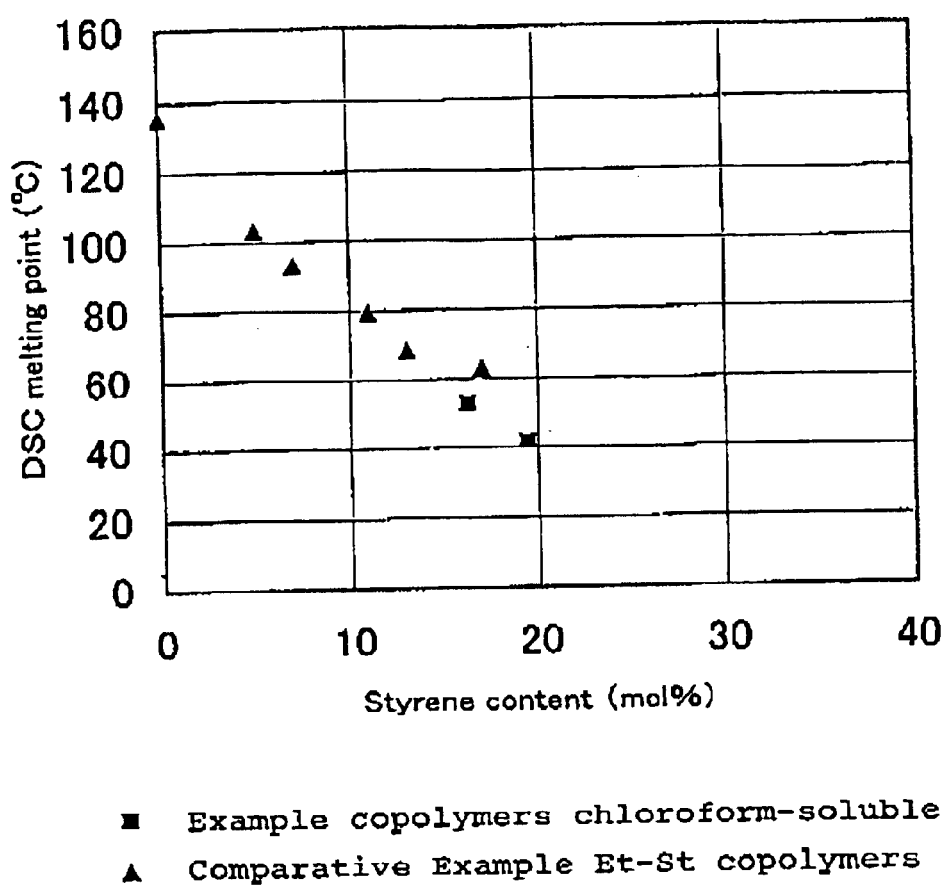
FIG. 2 shows a relation between DSC melting points and Comparative Example styrene-ethylene copolymers (RP-3 to RP-10) and respective Example copolymer chloroform-soluble content compositions (styrene contents) by solvent fractionation.

FIG. 2 shows a relation between DSC melting points and Comparative Example styrene-ethylene copolymers (RP-3 to RP-10) and respective Example copolymers (obtained in Examples 12 and 17 to 19) solvent-fractionated chloroform-soluble compositions (styrene contents).

The chloroform-soluble contents of the copolymers of the Examples showed a similar relation to the relation between the melting points and the compositions of the styrene-ethylene copolymers of the Comparative Examples.

Figure 3:
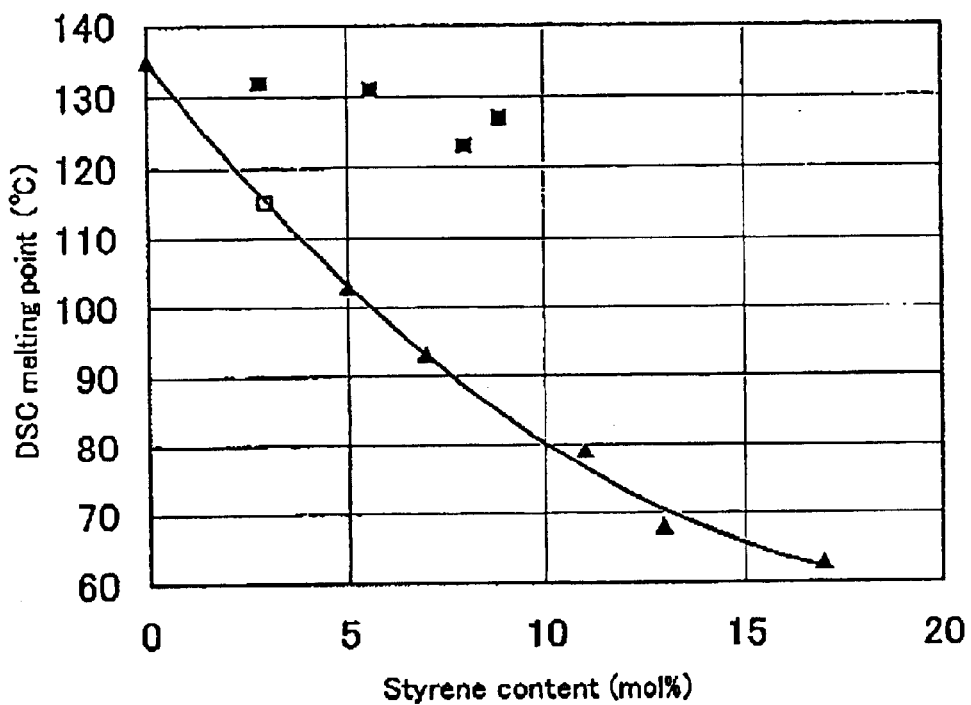
FIG. 3 shows a relation between DSC melting points and Comparative Example styrene-ethylene copolymers (RP-3 to RP-10) and respective Example copolymer chloroform-insoluble content compositions (styrene contents) by solvent fractionation.

FIG. 3 shows a relation between DSC melting points and Comparative Example styrene-ethylene copolymers (RP-3 to RP-10) and Example copolymers (obtained in Example 12 and Examples 17 to 19) solvent-fractionated chloroform-insoluble compositions (styrene contents). The chloroform-insoluble contents of the copolymers of the Examples showed quite a different relation to the relation between the melting points and the compositions of the styrene-ethylene copolymers of the Comparative Examples. It is evident that the chloroform-insoluble contents show at least one DSC melting point at 120° C. or higher regardless of their compositions (styrene contents).

Also, it was made clear by X-ray diffraction method that the copolymers obtained in Examples 12 and 17 to 19 and the chloroform-insoluble contents obtained by solvent fractionation provided a diffraction peak attributable to an ethylene chain transfer structure. However, a crystal diffraction peak attributable to a styrene chain transfer structure was not observed.

Further, a styrene unit amount contained in a styrene chain transfer structure comprising two or three or more styrene units was measured from 13C-NMR spectrum of the copolymers obtained in Examples 12 and 17 to 19 and the chloroform-insoluble contents obtained by solvent fractionation, but its amount was at most 5% of the styrene unit amount contained in the total polymer.

COMPARATIVE EXAMPLE 11

Preparation of a Styrene-Ethylene Copolymer Composition Having a Different Styrene Content and its Solvent Fractionation Styrene-ethylene copolymers obtained in Comparative Examples 3 and 10 (RP-3: 4 g and RP-10: 16 g) were weighed, and 200 ml of toluene were added thereto, and the mixture was heated and stirred in a 1 l autoclave substituted with nitrogen, at 130° C. for 2 hours to obtain a toluene solution.

This was precipitated with methanol to obtain a styrene-ethylene copolymer composition.

This composition was subjected to Soxhlet extraction by using chloroform in the same manner as in Examples 20 to 23. Analytical results of the chloroform-soluble content and the chloroform-insoluble content are shown in the following Table 12.

The chloroform-soluble content and the chloroform-insoluble content showed substantially the same composition, melting point and molecular weight as those of RP-10 and RP-3 respectively used in the polymer composition. Thus, such a composition of styrene-ethylene copolymers as having a melting point higher than the boiling point of chloroform and a melting point lower than the boiling point of chloroform were substantially completely fractionated into original copolymers by the Soxhlet extraction method of the present Example. FIG. 3 shows a relation between a melting point and the chloroform-insoluble content composition, but this was on the line connecting the plots of the Comparative Example styrene-ethylene copolymers unlike the cases of the chloroform-insoluble contents of Examples 20 to 23.

TEM Observation

Figure 4:
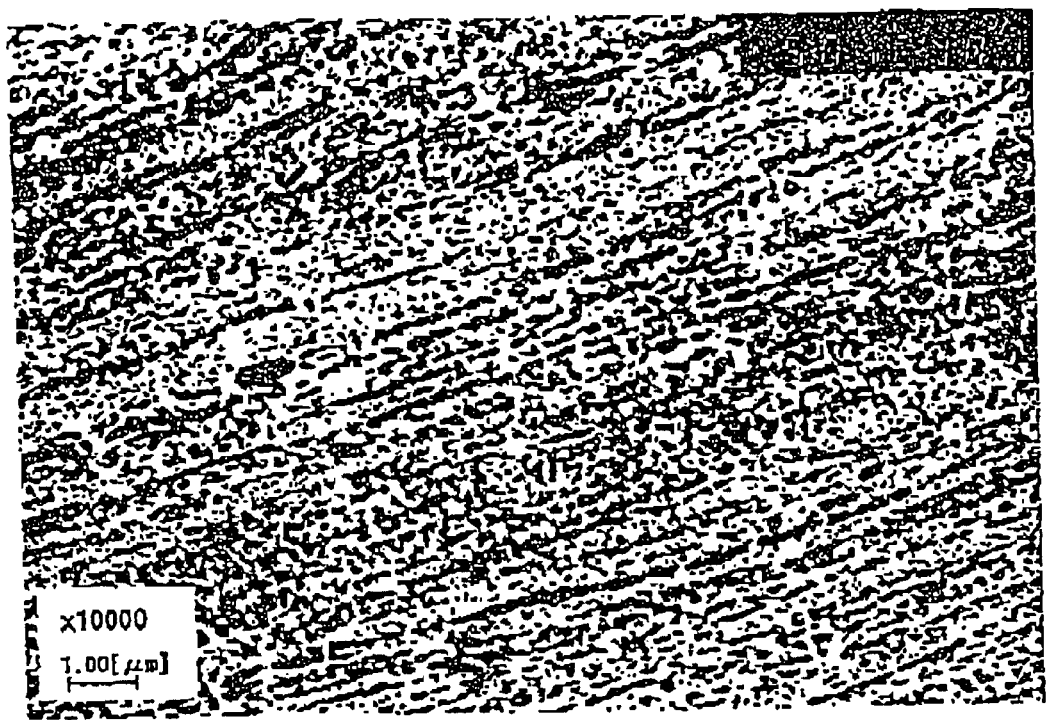
FIG. 4 is TEM photographs of a chloroform-insoluble content of the copolymer (P-12) obtained in Example 12.
Figure 4:
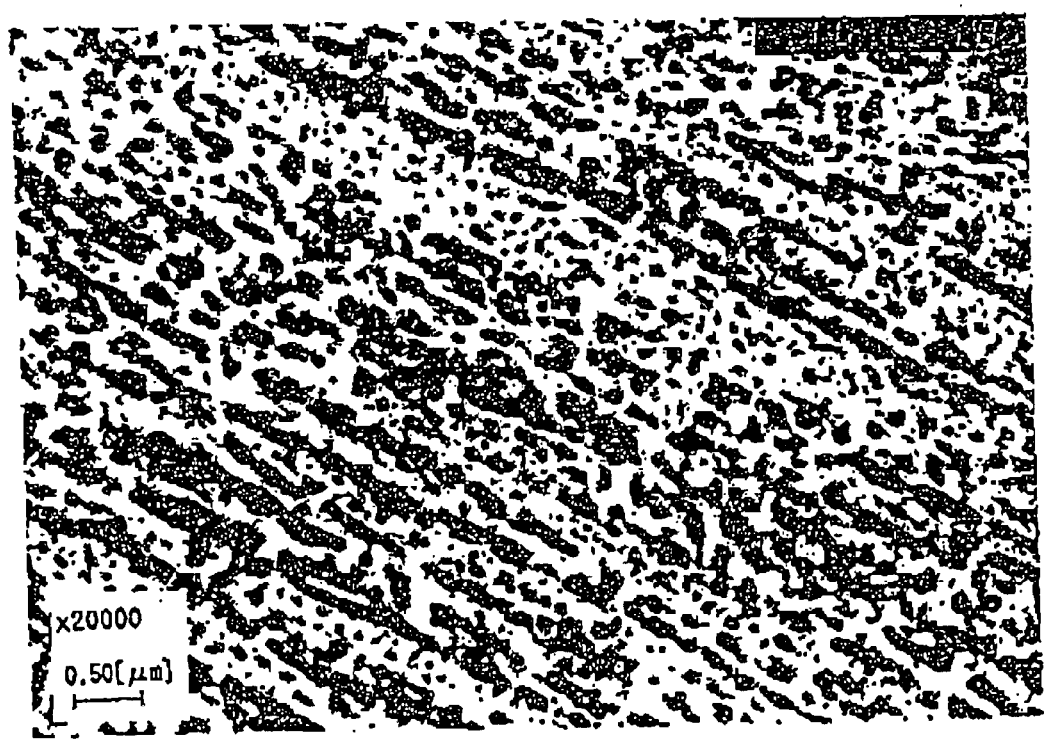

FIG. 4 shows a TEM photograph of a chloroform-insoluble content of the copolymer of Example 12, which was obtained in Example 20. A sheet obtained by press-forming at 180° C. for 2 minutes was used as a sample. A crystal phase (low styrene-content phase) was white, a low crystal phase (high styrene-content phase) was black. A fine structure (micro phase separation structure) having a sphere-like or layer-like, or rod-like regularity of a uniform size of $0.1\mu$ or less, was observed. In case of the copolymers of the present Examples, such a characteristic structure is observed.

10 g of each of styrene-ethylene copolymers (RP-3 and RP-9) obtained in Comparative Examples 3 and 9 was weighed, and 200 ml of toluene was added thereto, and the mixture was heated and stirred in a 1 l autoclave substituted with nitrogen, at 130° C. for 2 hours to obtain a toluene solution.

This was precipitated with methanol to obtain a styrene-ethylene copolymer composition.

Figure 5:
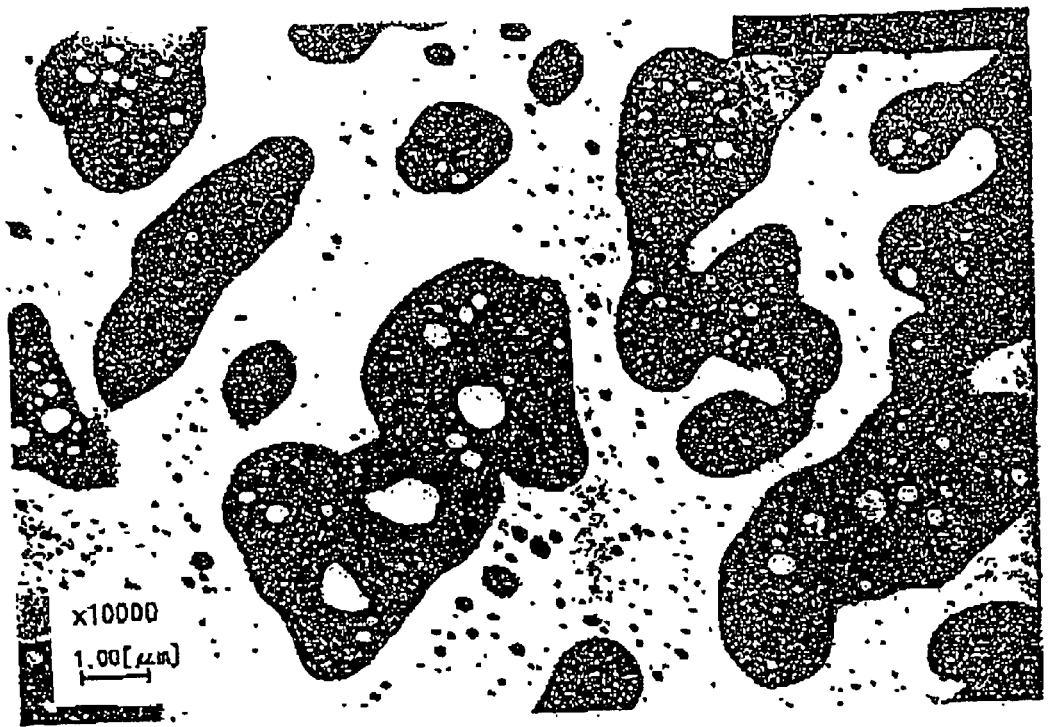
FIG. 5 is TEM photographs of a comparative sample (composition of styrene-ethylene copolymers of different compositions).
Figure 5:
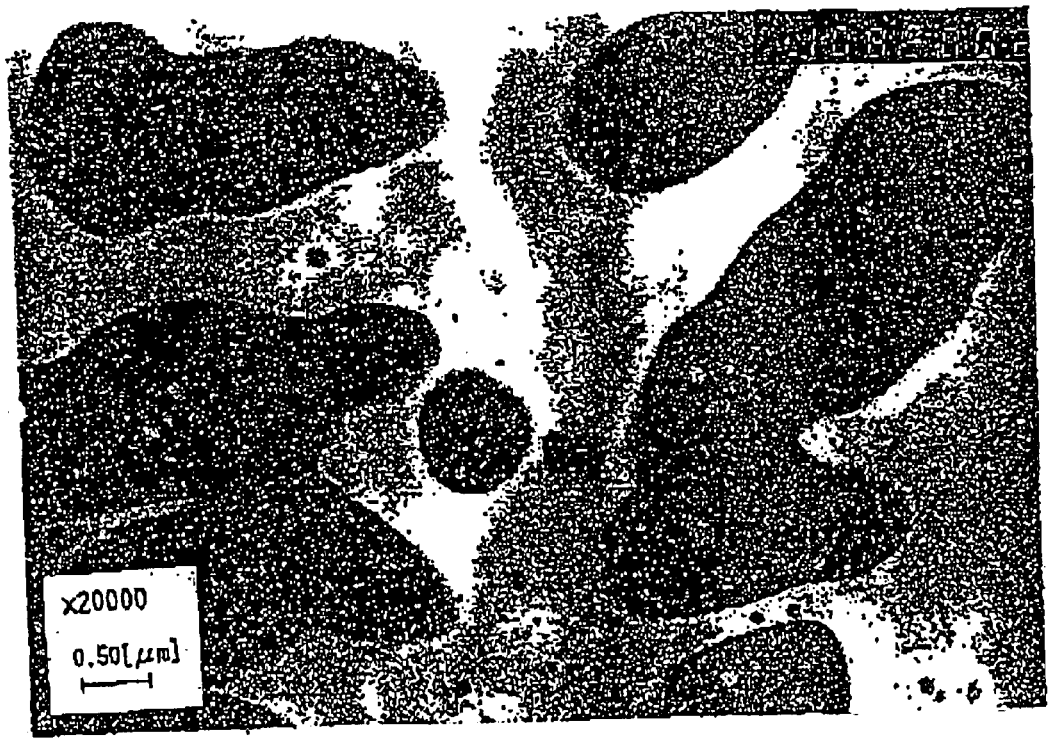

FIG. 5 shows a TEM photograph of this comparative example. In the same manner as above, a sheet obtained by press-forming at 180° C. for 2 minutes was used as a sample. An amorphous large (at least $1\mu$) continuous layer having a crystal phase (low styrene content phase) and a low crystal phase (high styrene content phase) intermingled, was observed. It is considered that such a structure is observed because a phase separation of respective polymers at a macroscopic level is caused due to poor compatibility between styrene-ethylene copolymers having different compositions or between polyethylene and a styrene-ethylene copolymer.

The above results show that the chloroform-insoluble contents of the copolymers of Examples 12 and 17 to 19 are novel copolymers. This copolymer is a novel "aromatic vinyl compound-ethylene copolymer" as defined in the present invention. It is considered that this copolymer is composed of a structure (having a styrene content of about at most 1 to 2 mol %) comprising mainly an ethylene chain transfer structure having a high melting point and a styrene-ethylene copolymer structure having a relatively high styrene content. The chloroform-insoluble content of the present invention (novel styrene-ethylene copolymer) is characterized by having a high melting point attributable to an ethylene chain transfer structure and having a glass transition point close to the glass transition point of the chloroform-insoluble content.

The copolymers obtained by polymerization in Examples 12 and 17 to 19 are "aromatic vinyl compound-olefin copolymer composition (aromatic vinyl compound-ethylene copolymer composition)" comprising this novel styrene-ethylene copolymer and "other olefin-styrene copolymer (styrene-ethylene copolymer)" as a chloroform-insoluble content.

TABLE 12

|  | Copolymer | Chloroform solvent fractionation | Wt % | St content | Melting point (° C.) | Heat of melting crystal (J/g) | Glass transition point (° C.) | Mw/ $10^4$ | Mw/Mn |
|---|---|---|---|---|---|---|---|---|---|
| Example 20 | P-12 | Soluble content | 76 | 19.4 | 42 | 9.6 | −21 | 24 | 2.3 |
|  |  | Insoluble content | 24 | 8.0 | 123 | 85 | −22 | 35 | 2.5 |

TABLE 12-continued

| | Copolymer | Chloroform solvent fractionation | Wt % | St content | Melting point (° C.) | Heat of melting crystal (J/g) | Glass transition point (° C.) | Mw/ $10^4$ | Mw/Mn |
|---|---|---|---|---|---|---|---|---|---|
| Example 21 | P-17 | Soluble content | 67 | 34.7 | Not measured | — | 7 | 24 | 2.7 |
| | | Insoluble content | 33 | 8.9 | 127 | 90 | 5 | 25 | 2.9 |
| Example 22 | P-18 | Soluble content | 81 | 28.5 | Not measured | — | −8 | 13 | 2.3 |
| | | Insoluble content | 19 | 2.8 | 132 | 151 | Unclear | 24 | 3.3 |
| Example 23 | P-19 | Soluble Insoluble | 61 | 16.2 | 53 | 22 | −21 | 13 | 2.4 |
| | | Insoluble content | 39 | 5.6 | 131 | 121 | −23 | 32 | 3.4 |
| Comparative Example 11 | Ethylene-styrene copolymer mixture ★ | Soluble content | 77 | 30.2 | Not measured | — | −4 | 15.6 | 2.3 |
| | | Insoluble content | 23 | 2.9 | 115 | 121 | Unclear | 12.6 | 2.5 |

★Comparative Example 11 ethylene-styrene copolymer mixture RP-3: RP-10, weight ratio 20:80

EXAMPLES 24 TO 26 AND COMPARATIVE EXAMPLES 12 to 14

Copolymer compositions were obtained in accordance with the following method by using such blending ratios as shown in the following Table 13, and C-set properties and heat resistance were measured.

Measurement of C-Set Properties

By using a Brabender plasticoder (PLE331 type manufactured by Brabender Co., Ltd.), a sample was obtained by melting a polymer and kneading at such ratios as shown in the following Table 13 at 200° C. at 60 rpm for 10 minutes. The sample was press-molded, and mechanical properties were measured, and also a high temperature compression set (C-set) was measured after subjecting to heat treatment under pressure at 70° C. for 24 hours in accordance with JIS K6262 (Table 13). The copolymer obtained in Example 12 had a relatively satisfactory C-set value (90%) as compared with the styrene-ethylene copolymer of Comparative Example and a composition of polyethylene and styrene-ethylene copolymer. Also, the copolymer of Example 12 showed an excellent heat resistance as compared with the styrene-ethylene copolymer having the same styrene content of Comparative Example. These are considered to be due to an effect of a novel copolymer or copolymer composition contained therein.

Further, the copolymer of Example 12 is greatly improved in respect of C-set value by blending with polyethylene and a plasticizer, and heat resistance is also improved. Also, it is possible to lower hardness by adding a plasticizer. It is considered that this is because a novel copolymer contained therein works as a compatibilizer with polyethylene and a plasticizer.

TABLE 13

| Example copolymers | Example 24 P-12 100 parts | Example 25 P-12 100 parts | Example 26 P-12 100 parts |
|---|---|---|---|
| Stabilizer (Irganox1010) | 0.3 part | 0.3 part | 0.3 part |

TABLE 13-continued

| Example copolymers | Example 24 P-12 100 parts | Example 25 P-12 100 parts | Example 26 P-12 100 parts |
|---|---|---|---|
| Plasticizer (naphthene type oil) NS-100 | — | 50 parts | 50 parts |
| High-density polyethylene 7000 F. | — | 50 parts | 20 parts |
| Hardness (shore A) | 78 | 87 | 72 |
| C-set (%) 70° C., 24 h | 90 | 58 | 64 |
| Heat softening resistance 120° C. 2 h | ◯ | ◉ | ◯ |

◯: Not melted, but shrank;
◉: Not melted, and no change in shape;
and X: Melted and fell The third feature of the present invention resides in a method for producing a novel copolymer or a composition containing the novel copolymer. The copolymer in this case means an olefin copolymer and an aromatic vinyl compound-olefin copolymer in the present specification. A novel copolymer or a composition containing the same can be preferably obtained directly by polymerizing each monomer in accordance with the above production method of the present invention. Further, it is considered that the novel olefin copolymer or aromatic vinyl compound-olefin copolymer has a block-like structure.

That is, they can be produced by a polymerization catalyst containing a transition metal compound of the above formula (1) wherein Y is a substituted boron group having bonds to A and B and having hydrogen or a $C_{1-20}$ hydrocarbon group, as a substituent, and the hydrocarbon substituent is an alkyl group, an aryl group, an alkylaryl group or an arylalkyl group. Preferably, it is a transition metal compound wherein Y is a substituted boron group having a $C_{6-20}$ aryl group. In such a case, the substituent in Y may contain from 1 to 3 boron, silicon, phosphorus, selenium, oxygen, sulfur or halogen atoms.

More preferably, it is produced by a polymerization catalyst containing a transition metal compound of the above formula (1), wherein each of R1a, R2a and R3a in A is hydrogen.

Examples of an olefin monomer and an aromatic vinyl compound monomer concretely used in this production method are the same as those illustrated with reference to the second feature of the present invention.

By using the transition metal compound of this invention, it is possible to form a block structure by a change in polymerization probability and coordination probability of a monomer in accordance with a change in coordination environment of a monomer accompanied by a structure transition between SP2 structure and SP3 structure generated at an active site during polymerization. It may be possible to induce the structure transition between SP3 structure and SP3 structure by a mutual action with a cocatalyst such as a MAO and the like during polymerization.

A structure capable of causing the structure transition between SP2 structure and SP3 structure is concretely a structure of a boron atom or an aluminum atom at a part crosslinking to cyclopentadienyl rings and a structure bonded therewith, but when a strong Lewis base material such as ether is irreversibly coordinated therein, it is not preferable for the present invention since its structure contains a bond with the Lewis base material and is fixed on the SP3 type hybrid orbit.

Thus, it is preferable that such a strong Lewis base material as ether, amine or phosphine is not previously coordinated with a boron or aluminum atom in Y.

Figure 6:
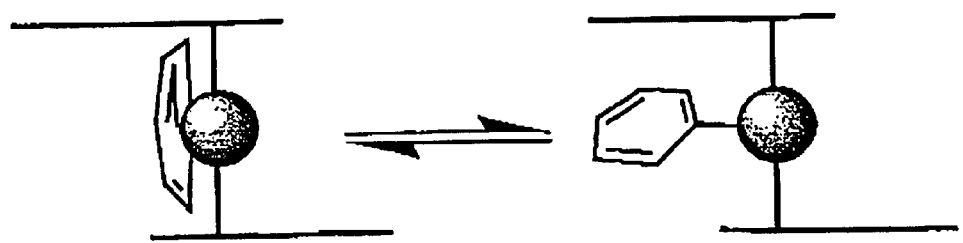
FIG. 6 illustrates structure transition between SP2 structure (to provide a high styrene content copolymer) and SP3 structure (to provide a low styrene content copolymer) of a transition metal compound of the present invention.
Figure 6:
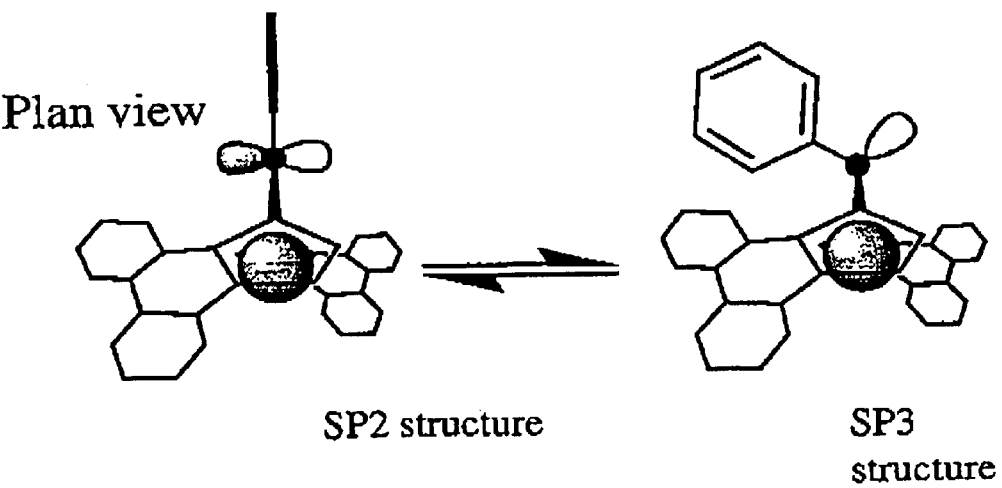

The present invention relates to a method for producing a block copolymer or a block copolymer composition (a polymer composition containing the block copolymer) by using a specific transition metal compound as a catalyst component for polymerization. Thus, the present invention relates to a method for producing a block copolymer or a block copolymer composition by using a structure transition between SP2 and SP3 hybrid orbits of the transition metal compound catalyst as illustrated in FIG. 6. By using a transition metal compound having a structure capable of causing a structure transition between SP2 structure and SP3 structure at a part of the structure of the transition metal compound, a steric structure in the vicinity of a polymerization active site induced by the transition metal compound is varied during polymerization, and it is consequently possible to obtain a block copolymer containing a copolymer block obtained corresponding to respective structures or a block copolymer composition (polymer composition containing this block copolymer).

In the transition metal compound of the above formula (1), when a crosslinking structure Y has a bonded structure of nitrogen and boron (such as various aminoboranediyl groups), it becomes difficult to cause a structure transition between SP2 structure and SP3 structure because double bonding properties of this structure are high and therefore a boron-crosslinked part is fixed on the SP2 structure. Further, in the transition metal compound of the formula (1), if a substituent other than hydrogen is present in each of R1a, R2a and R3a of ligand A, there is a case wherein the structure transition between the SP2 structure and the SP3 structure is inhibited due to steric hindrance.

The fourth feature of the present invention resides in a novel copolymer or a composition containing the same. It is possible to produce them by the production method described with reference to the third feature of the present invention. This novel copolymer can be separated from a composition containing the novel copolymer by an appropriate method such as solvent fractionation.

A preferable example of the novel copolymer of the present invention includes an aromatic vinyl compound-olefin block copolymer. Particularly, the aromatic vinyl compound-olefin block copolymer of the present invention is an aromatic vinyl compound-olefin block copolymer, wherein the aromatic vinyl compound content is from 2 mol % to 50 mol %, the remainder is an olefin, and the aromatic vinyl compound content and at least one melting point of melting points in which a crystal-melting heat observed by DSC measurement is at least 10 J/g, satisfy the following relational formulae, $$-4 \cdot St + 140 \leq Tm \leq 140 \ (2 \leq St \leq 5)$$

$$120 \leq Tm \leq 140 \ (5 \leq St \leq 50)$$

Tm: a melting point in which a crystal-melting heat observed by DSC measurement is at least 10 J/g, St: an aromatic vinyl compound content (mol %).

Preferably, the present invention relates to an aromatic vinyl compound-olefin block copolymer characterized by having a crystal structure derived from an olefin chain transfer block structure. A crystal structure derived from this olefin chain transfer block structure can be identified by a well known method such as X-ray diffraction method. This olefin chain transfer block structure enables to provide a high melting point in DSC measurement. More preferably, the present invention provides an aromatic vinyl compound-olefin block copolymer characterized in that the olefin block copolymer has a crystal structure derived from an ethylene chain transfer block structure.

The most preferable aromatic vinyl compound-olefin block copolymer of the present invention is "aromatic vinyl compound-ethylene block copolymer" composed of an ethylene chain transfer block and an aromatic vinyl compound-ethylene copolymer block.

Thus, the block copolymer of the present invention is a copolymer having an olefin chain transfer block structure (preferably ethylene chain transfer block structure) having a high heat resistance and an aromatic vinyl compound-olefin copolymer structure (preferably aromatic vinyl compound-ethylene copolymer structure) in its polymer chain.

It is preferable for a soft block copolymer that an amount of an aromatic vinyl compound (styrene) chain transfer structure contained in the block copolymer is small. Preferably, an aromatic vinyl compound unit amount contained in the aromatic vinyl compound (styrene) chain transfer structure is at most 20%, more preferably at most 5%, to the total aromatic vinyl compound unit amount contained in the total copolymer. Also, it is preferable for a soft block copolymer or a block copolymer having a satisfactory moldability or processibility to have no crystal structure derived from an aromatic vinyl compound (styrene) chain transfer structure. It is necessary for this purpose that the aromatic vinyl compound (styrene) chain transfer structure does not have such an easily crystallizable syndiotactic stereoregularity as having a high crystallization speed.

More preferably, the aromatic vinyl compound-olefin block copolymer of the present invention has an aromatic vinyl compound content of from 2 mol % to 30 mol %, most preferably from 2 mol % to 20 mol %. The copolymer in the claimed composition range of the present invention has a satisfactory heat resistance due to a crystal structure derived from an olefin chain transfer block structure and satisfactory soft and compatible properties derived from an aromatic vinyl compound-olefin copolymer chain transfer structure.

The aromatic vinyl compound-olefin block copolymer of the present invention is most preferable in case that the aromatic vinyl compound is styrene and the olefin is ethylene.

Preferably, the aromatic vinyl compound-olefin block copolymer is characterized in that a molecular weight distribution obtained by gel permeation chromatography is from 1.2 to 4, preferably from 1.5 to 3. More preferably, the molecular weight distribution obtained by gel permeation chromatography is monodispersion.

The present invention further resides in "aromatic vinyl compound-olefin block copolymer composition (polymer composition containing aromatic vinyl compound-olefin block copolymer)". This composition is preferably obtained directly by polymerization of each monomer in accordance with the production method described with reference to the third feature of the present invention.

The "aromatic vinyl compound-olefin block copolymer composition" of the present invention contains at least 1 wt % of the aromatic vinyl compound-olefin block copolymer of the present invention in the composition.

That is, the aromatic vinyl compound-olefin block copolymer composition of the present invention is characterized in that an average aromatic vinyl compound content is from 5 mol % to 50 mol % and at least one melting point of melting points having a crystal-melting heat of at least 10 J/g in DSC measurement, is observed in a range of from 110° C. to 140° C., preferably from 120° C. to 140° C.

In the present invention, the olefin is preferably ethylene. Also, in the present invention, the aromatic vinyl compound is preferably styrene.

The aromatic vinyl compound-olefin block copolymer composition obtained in the present invention provides an aromatic vinyl compound-olefin block copolymer of the present invention by using an appropriate separation method such as a solvent fractionation method. However, it there is no problem in physical properties, the composition can be used for various uses without separation.

The "aromatic vinyl compound-olefin block copolymer composition" of the present invention may contain not only the "aromatic vinyl compound-olefin block copolymer" but also at least 1 wt % of other optional polymer. Examples of the other optional polymers include an aromatic vinyl compound-olefin copolymer not included in the concept of "aromatic vinyl compound-olefin block copolymer", an olefinic polymer, its copolymer, an aromatic vinyl compound type polymer, its copolymer, and other polymerizable vinyl compounds such as vinyl chloride, vinyl acetate, acrylonitrile or acrylic acid ester. The term "aromatic vinyl compound-olefin" is defined in accordance with the description of the present specification.

Further, a filler or a plasticizer generally usable by those skilled in the art may be contained in an amount in a range of from 1 to 80 wt %, preferably from 5 to 50 wt %, to the resin composition.

INDUSTRIAL APPLICABILITY

The polymerization catalyst comprising the transition metal catalyst component for polymerization, of the present invention, shows a very high polymerization activity and presents an olefin (co)polymer and an aromatic vinyl compound-olefin copolymer, with high efficiency, and it is industrially very useful.

What is claimed is:

1. A transition metal catalyst component for polymerization, represented by formula (1):

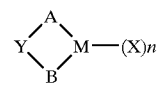

(1)

wherein, in the formula, A is an unsubstituted or substituted benzindenyl group having the following formula (5), (6) or (7):

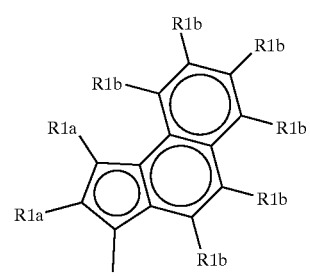

(5)

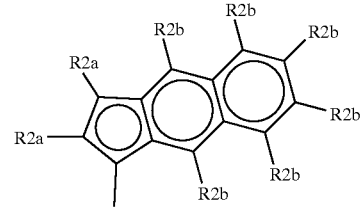

(6)

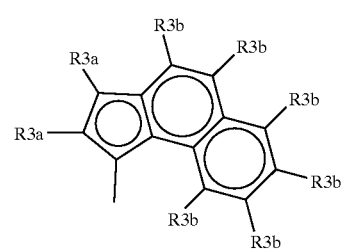

(7)

wherein in the above formulae (5) to (7), each of R1a, R1b, R2a, R2b, R3a and R3b which are independent of each other, is hydrogen, a $C_{1-20}$ alkyl group, a $C_{6-10}$ aryl group or a $C_{7-20}$ alkylaryl group, or each group optionally contains from one to three halogen atoms, silicon atoms, phosphorus atoms, oxygen atoms, boron atoms, nitrogen atoms, sulfur atoms and/or selenium atoms, or each group is optionally substituted by an $OSiR_3$ group, a $SiR_3$ group, an $NR_2$ group, an OH group, an OR group or a $PR_2$ group, wherein each R represents a $C_{1-10}$ hydrocarbon group, wherein the plurality of R1a, R1b, R2a, R3b, R3a and R3b groups, may be the same or different from one another, and adjacent such substituents may together form a single or plural 5- to 8-membered aromatic or aliphatic rings;

B is the same unsubstituted or substituted benzindenyl group as described above, or an unsubstituted or substituted cyclopentadienyl group, an unsubstituted or substituted indenyl group, or an unsubstituted or substituted fluorenyl group, which has the following formula (8), (9) or (10):

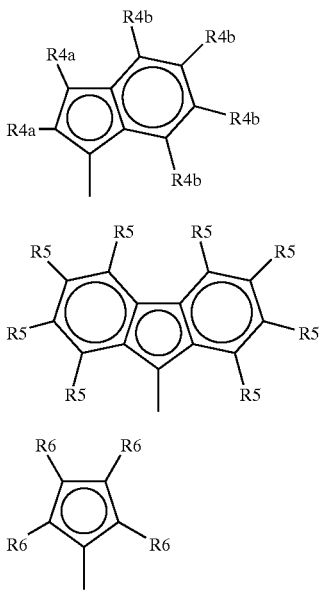

wherein in the above formulae (8) to (10), each of R4a, R4b, R5 and R6 which are independent of each other, is hydrogen, a $C_{1-20}$ alkyl group, a $C_{6-10}$ aryl group or a $C_{7-20}$ alkylaryl group, or each group optionally contains from one to three halogen atoms, silicon atoms, phosphorus atoms, oxygen atoms, boron atoms, nitrogen atoms, sulfur atoms and/or selenium atoms, or each group optionally is substituted by an $OSiR_3$ group, a $SiR_3$ group, an $NR_2$ group, an OH group, an OR group or a $PR_2$ group, wherein each R represents a $C_{1-10}$ hydrocarbon group, and wherein the plurality of R4a, R4b, R5 and R6 groups, may be the same or different from one another;

when both A and B are unsubstituted or substituted benzindenyl groups, both may be the same or different;

Y is a substituted boron group having bonds to A and B and having hydrogen or a $C_{1-20}$ hydrocarbon group, as a substituent, and the substituent in Y may contain from one to three nitrogen, boron, silicon, phosphorus, selenium, oxygen or sulfur atoms or may have a cyclic structure;

X is hydrogen, halogen, a $C_{1-15}$ alkyl group, a $C_{3-15}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amide or amino group having a $C_{1-22}$ hydrocarbon substituent, n is an integer of 0, 1 or 2, and when X is two, each X is the same or different; and M is zirconium, hafnium or titanium.

2. The transition metal catalyst component according to claim 1, wherein, in the above formulae (5) to (8), R1a, R2a, R3a and R4a are each hydrogen.

3. The transition metal catalyst component according to claim 1, wherein A is a member selected from the group consisting of a 4,5-benz-1-indenyl group, a 5,6-benz-1-indenyl group, a 6,7-benz-1-indenyl group, an α-acenaphtho-1-indenyl group, a 3-cyclopenta[c]phenanthryl group and a 1-cyclopenta[1]phenanthryl group, and B is a member selected from the group consisting of a 4,5-benz-1-indenyl group, a 5,6-benz-1-indenyl group, a 6,7-benz-1-indenyl group, an α-acenaphtho-1-indenyl group, a 3-cycloenta[c]phenanthryl group, a 1-cyclopenta[1]phenanthryl group, a 1-indenyl group, a 4-phenylindenyl group and a 4-naphthylindenyl group.

4. The transition metal catalyst component according to claim 1, wherein, in the above formulae (5) to (7), one of each R1a, R2a or R3a is a $C_{1-20}$ alkyl group, a $C_{6-20}$ aryl group or a $C_{7-20}$ alkylaryl group.

5. The transition metal catalyst component according to claim 1, wherein A is a 2-methyl-4,5-benzindenyl group, a 1-(2-methylcyclopenta[1]phenanthryl) group or a 3-(2-methylcyclopenta[c]phenanthryl) group.

6. The transition metal catalyst component according to claim 1, wherein Y is a phenylboranediyl group.

7. The transition metal catalyst component according to claim 1, wherein Y is a substituted boron group selected from the group consisting of a dialkylaminoboranediyl group, an alkyl-substituted silylboranediyl group, an alkyl-substituted silylaminoboranediyl group, an alkyl-substituted sily-substituted methylboranediyl group and an alkoxy-substituted boranediyl group.

8. The transition metal catalyst component according to claim 1, wherein Y is a substituted boron group selected from the group consisting of a dimethylaminoboranediyl group, a diisopropylaminoboranediyl group, a dimethylsilylboranediyl group, a bistrimethylsiylaminoboranediyl group, a tristrimethylsilymethylboranediyl group and a bist-rimethylsilylmethylboranediyl group, a dimethylsilylaminoboranediyl group, an isopropoxyboranediyl group and a tertiary butoxyboranediyl group.

9. The transition metal catalyst component according to claim 1, wherein M is zirconium.

10. The transition metal catalyst component according to claim 1, wherein Y is a substituted boron group having bonds to A and B and having hydrogen or a $C_{1-20}$ hydrocarbon group selected from the group consisting of an alkyl group, and aryl group, an alkylaryl group and an arylakyl group, as a substituent, and the substituent in Y may contain from 1 to 3 boron, silicon, phosphorus, selenium, oxygen, sulfur or halogen atoms.

11. The transition metal catalyst component according to claim 10, wherein each of R1a, R2a and R3a of A is hydrogen.

12. A polymerization catalyst comprising the transition metal catalyst component for polymerization as defined in claim 1 and a cocatalyst.

13. The polymerization catalyst according to claim 12, wherein the cocatalyst is an aluminoxane having formula (2) or (3):

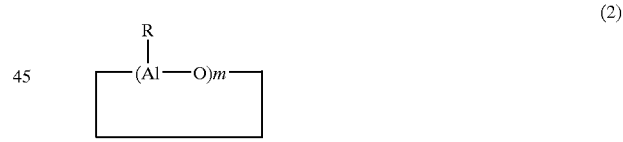

(2)

wherein, in the formula, R is a $C_{1-5}$ alkyl group, a $C_{6-10}$ aryl group or hydrogen, and m is an integer ranging from 2 to 100, provided that a plurality of R groups are the same or different from one another;

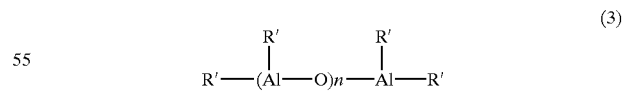

(3)

wherein, in the formula, R' is a $C_{1-5}$ alkyl group, a $C_{6-10}$ aryl group or hydrogen, and n is an integer ranging from 2 to 100, provided that a plurality of R' groups are the same or different from one another.

14. The polymerization catalyst according to claim 12, wherein the cocatalyst is a boron compound.

15. A method for producing an olefin polymer or copolymer, comprising:

polymerizing olefin monomer in the presence of a polymerization catalyst comprising a transition metal catalyst component as defined in claim 1 and a cocatalyst.

16. A method for producing an olefin polymer or copolymer, comprising:
polymerizing olefin monomer in the presence of a polymerization catalyst comprising a transition metal catalyst component as defined in claim 4 and a cocatalyst.

17. A method for producing an olefin polymer or copolymer, comprising:
polymerizing an olefin monomer in the presence of a polymerization catalyst comprising a transition metal catalyst component as defined in claim 5 and a cocatalyst.

18. A method for producing an ethylene polymer or copolymer, comprising:
polymerizing ethylene monomer in the presence of a polymerization catalyst comprising a transition metal catalyst component as defined in claim 1 and a cocatalyst.

19. A method for producing an aromatic vinyl compound-olefin copolymer, comprising:
polymerizing an aromatic vinyl compound and olefin monomer in the presence of a polymerization catalyst comprising a transition metal catalyst component as defined in claim 1 and a cocatalyst.

20. A method for producing an aromatic vinyl compound-olefin copolymer, comprising:
polymerizing an aromatic vinyl compound and olefin monomer in the presence of a polymerization catalyst comprising a transition metal catalyst component as defined in claim 2 and a cocatalyst.

21. A method for producing an aromatic vinyl compound-olefin copolymer, comprising:
polymerizing an aromatic vinyl compound and olefin monomers in the presence of a polymerization catalyst comprising a transition metal catalyst component as defined in claim 3 and a cocatalyst.

22. An olefin (co)polymer prepared by the method as defined in claim 15.

23. An olefin (co)polymer prepared by the method as defined in claim 16.

24. An aromatic vinyl compound-olefin copolymer prepared by the method as defined in claim 19.

25. An aromatic vinyl compound-olefin copolymer prepared by the method as defined in claim 20.

26. An aromatic vinyl compound-olefin copolymer prepared by the method as defined in claim 21.

27. An ethylene-α-olefin-aromatic vinyl compound copolymer or an ethylene-cyclic olefin-aromatic vinyl compound copolymer, prepared by the method as defined in claim 19.

28. An ethylene-α-olefin-aromatic vinyl compound copolymer or an ethylene-cyclic olefin-aromatic vinyl compound copolymer, prepared by the method as defined in claim 20.

29. An ethylene-α-olefin-aromatic vinyl compound copolymer or an ethylene-cyclic olefin-aromatic vinyl compound copolymer, prepared by the method as defined in claim 21.

30. A method for producing an olefin block copolymer or an aromatic vinyl compound-olefin block copolymer, comprising:
polymerizing olefin monomers or an aromatic vinyl compound and olefin monomer in the presence of a polymerization catalyst comprising the transition metal catalyst component as defined in claim 10 and a cocatalyst.

31. An olefin block copolymer or an aromatic vinyl compound-olefin block copolymer, prepared by the method as defined in claim 30.

32. The aromatic vinyl compound-olefin block copolymer according to claim 31, wherein the aromatic vinyl compound content ranges from 2 mol % to 50 mol %, the remainder is an olefin, and the aromatic vinyl compound content and at least one melting point of melting points in which a crystal-melting heat observed by DSC measurement is at least 10 J/g, thereby satisfying the following, $$-4 \cdot St + 140 \leq Tm \leq 140 (2 \leq St \leq 5)$$

$$120 \leq Tm \leq 140 (5 \leq St \leq 50)$$

wherein Tm: a melting point in which a crystal-melting heat observed by DSC measurement is at least 10 J/g St: an aromatic vinyl compound content (mol %).

33. The aromatic vinyl compound-olefin block copolymer composition according to claim 31, wherein the block copolymer comprises at least 1 wt % of an aromatic vinyl compound-olefin block copolymer having an average aromatic vinyl compound content ranging from 5 mol % to 50 mol % and having at least one melting point of melting points in which a crystal-melting heat is at least 10 J/g observed by DSC measurement, in the range from 110° C. to 140° C.

34. The aromatic vinyl compound-olefin block copolymer composition according to claim 33, wherein the temperature range of the DSC measurement is 120° C. to 140° C.

35. The method of claim 30, wherein the aromatic vinyl compound-olefin block copolymer is a component of an aromatic vinyl compound-olefin block copolymer composition.

36. A transition metal catalyst, which comprises: a transition metal catalyst component represented by formula (1):

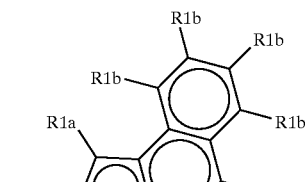
(1)

wherein, in the formula, A is an unsubstituted or substituted benzindenyl group having the following formula (5), (6) or (7):

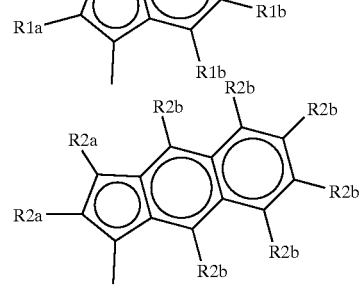

-continued

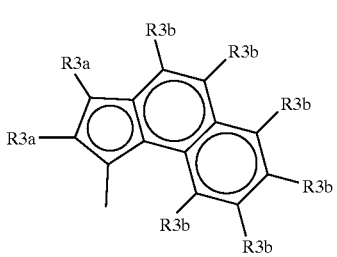

(7)

wherein in the above formulae (5) to (7), each of R1a, R1b, R2a, R2b, R3a and R3b which are independent of each other, is hydrogen, a $C_{1-20}$ alkyl group, a $C_{6-10}$ aryl group or a $C_{7-20}$ alkylaryl group, or each group optionally contains from one to three halogen atoms, silicon atoms, phosphorus atoms, oxygen atoms, boron atoms, nitrogen atoms, sulfur atoms and/or selenium atoms, or each group is optionally substituted by an $OSiR_3$ group, a $SiR_3$ group, an $NR_2$ group, an OH group, an OR group or a $PR_2$ group, wherein each R represents a $C_{1-10}$ hydrocarbon group, wherein the plurality of R1a, R1b, R2, R2b, R3a and R3b groups, may be the same or different from one another, and adjacent such substituents may together form a single or plural 5- to 8-membered aromatic or aliphatic rings;

B is the same unsubstituted or substituted benzindenyl group as described above, or an unsubstituted or substituted cyclopentadienyl group, an unsubstituted or substituted indenyl group, or an unsubstituted or substituted fluourenyl group, which has the following formula (8), (9) or (10):

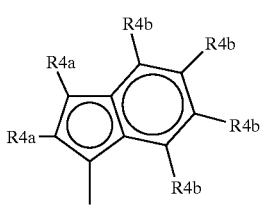

(8)

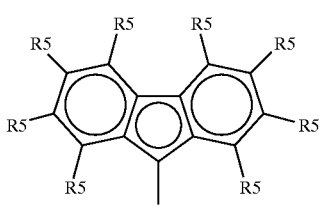

(9)

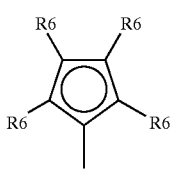

(10)

wherein in the above formulae (8) to (10), each of R4a, R4b, R5 and R6 which are independent of each other, is hydrogen, a $C_{1-20}$ alkyl group, a $C_{6-10}$ aryl group or a $C_{7-20}$ alkylaryl group, or each group optionally contains from one to three halogen atoms, silicon atoms, phosphorus atoms, oxygen atoms, boron atoms, nitrogen atoms, sulfur atoms and/or selenium atoms, or each group optionally is substituted by an $OSiR_3$ group, a $SiR_3$ group, an $NR_2$ group, an OH group, an OR group or a $PR_2$ group, wherein each R represents a $C_{1-10}$ hydrocarbon group, and wherein the plurality of R4a, R4b, R5 and R6 groups, may be the same or different from one another;

when both A and B are unsubstituted or substituted benzindenyl groups, both may be the same or different;

Y is a substituted boron group having bonds to A and B and having hydrogen or a $C_{1-20}$ hydrocarbon group, as a substituent, that contains from one to three nitrogen, boron, silicon, phosphorus, selenium, oxygen or sulfur atoms or may have a cyclic structure;

X is hydrogen, halogen, a $C_{1-15}$ alkyl group, a $C_{3-15}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amide or amino group having a $C_{1-22}$ hydrocarbon substituted, n is an integer of 0, 1 or 2, and when X is two, each X is the same or different; and M is zirconium, hafnium or titanium; and a cocatalyst.

37. A method of producing an olefin block copolymer or an aromatic vinyl compound-olefin block copolymer, comprising:

polymerizing olefin monomers or an aromatic vinyl compound and olefin monomer in the presence of a polymerization catalyst comprising a transition metal catalyst component represented by formula (1):

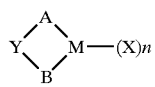

(1)

wherein, in the formula, A is an unsubstituted or substituted benzindenyl group having the following formula (5), (6) or (7):

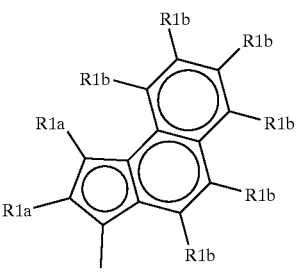

(5)

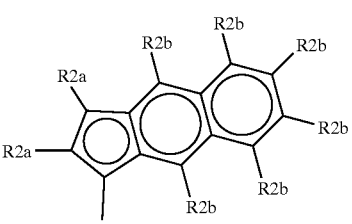

(6)

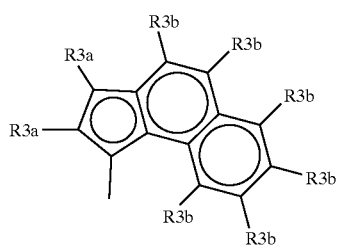

(7)

wherein in the above formulae (5) to (7), each of R1a, R1b, R2a, R2b, R3a and R3b which are independent of each other, is hydrogen, a $C_{1-20}$ alkyl group, a $C_{6-10}$ aryl group or a $C_{7-20}$ alkylaryl group, or each group optionally contains from one to three halogen atoms, silicon atoms, phosphorus atoms, oxygen atoms, boron atoms, nitrogen atoms, sulfur atoms and/or selenium atoms, or each group is optionally substituted by an $OSiR_3$ group, a $SiR_3$ group, an $NR_2$ group, an OH group, an OR group or a $PR_2$ group, wherein each R represents a $C_{1-10}$ hydrocarbon group, wherein the plurality of R1a, R1b, R2a, R2b, R3a and R3b groups, may be the same or different from on another, and adjacent such substituents may together form a single or plural 5- to 8-membered aromatic or aliphatic rings;

B is the same unsubstituted or substituted benzindenyl group as described above, or an unsubstituted or substituted cyclopentadienyl group, an unsubstituted or substituted indenyl group, or an unsubstituted or substituted flourenyl group, which has the following formula (8), (9) or (10):

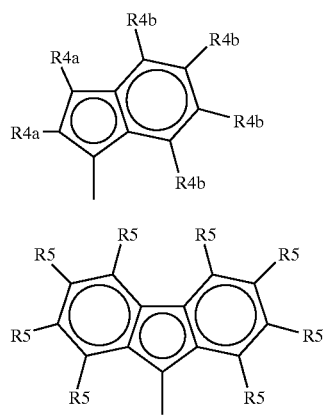

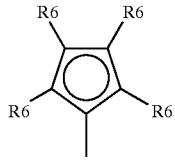

wherein in the above formulae (8) to (10), each of R4a, R4b, R5 and R6 which are independent of each other, is hydrogen, a $C_{1-20}$ alkyl group, a $C_{6-10}$ aryl group or a $C_{7-20}$ alkylaryl group, or each group optionally contains from one to three halogen atoms, silicon atoms, phosphorus atoms, oxygen atoms, boron atoms, nitrogen atoms, sulfur atoms and/or selenium atoms, or each group optionally is substituted by an $OSiR_3$ group, a $SiR_3$ group, an $NR_2$ group, an OH group, an OR group or a $PR_2$ group, wherein each R represents a $C_{1-10}$ hydrocarbon group, and wherein the plurality of R4a, R4b, R5 and R6 groups, may be the same or different from one another;

when both A and B are unsubstituted or substituted benzindenyl groups, both may be the same or different;

Y is a boron atom or aluminum atom that is bonded to a cyclopentadienyl ring which crosslinks to A and B but in the absence of a strong Lewis base;

X is hydrogen, halogen, a $C_{1-15}$ alkyl group, a $C_{3-15}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amide or amino group having a $C_{1-22}$ hydrocarbon substituent, n is an integer of 0, 1 or 2, and when X is two, each X is the same or different; and M is zirconium, hafnium or titanium.

* * * * *